United States Patent [19]

Koper et al.

[11] Patent Number: 5,611,273

[45] Date of Patent: Mar. 18, 1997

[54] CHECK WRITING MACHINE

[75] Inventors: Robert P. Koper, Bensenville; Howard R. Konieczka, Chicago, both of Ill.

[73] Assignee: The Paymaster Corporation, Chicago, Ill.

[21] Appl. No.: 367,001

[22] Filed: Dec. 30, 1994

[51] Int. Cl.$^6$ ........................................ B41J 1/32
[52] U.S. Cl. ................. 101/93.21; 101/93.24; 101/96
[58] Field of Search ..................... 101/95, 96, 99, 101/100, 106, 93.18, 93.2, 93.21, 93.24, 93.25, 396; 400/207, 208

[56] References Cited

U.S. PATENT DOCUMENTS

| | | | |
|---|---|---|---|
| 3,529,543 | 9/1970 | Gopperton | 101/95 |
| 3,955,497 | 5/1976 | Syndor | 101/95 |
| 4,343,243 | 8/1982 | Gentry et al. | 101/96 |
| 5,086,697 | 2/1992 | Koper | 101/336 |

*Primary Examiner*—John S. Hilten
*Attorney, Agent, or Firm*—Emrich & Dithmar

[57] ABSTRACT

The check writer for imprinting checks is comprised of a frame having a printing line, a plurality of type segment members supported by the frame, with each segment member having a set of offset printing characters thereon on the segment member facing and being moveable to locate the desired printing characters on the printing line, and a prefix holder assembly supported by the frame and structurally arranged to receive and position a sliding prefix plate adjacent to the printing characters on the printing line. The width and length dimensions of each printing face on each type segment is substantially identical. Additionally, the check writer includes an inked ribbon and ribbon support member supporting the ribbon adjacent to the printing characters disposed on the printing line, a platen supported by the frame, and an actuating mechanism supported by the frame and movable from a normal non-printing position to an activated printing position for effecting the printing operation. Also, a linkage member is provided and operatively coupled to the actuating mechanism. The linkage member is structurally arranged and coupled to the platen for moving the platen into pressure contact with the negotiable instrument positioned between the platen and the printing characters disposed on the printing line to provide an imprint on the check and for returning the platen and prefix plate back to their normal at rest position upon the return movement of the actuating mechanism to its normal at rest position.

20 Claims, 19 Drawing Sheets

91    85

91    23b

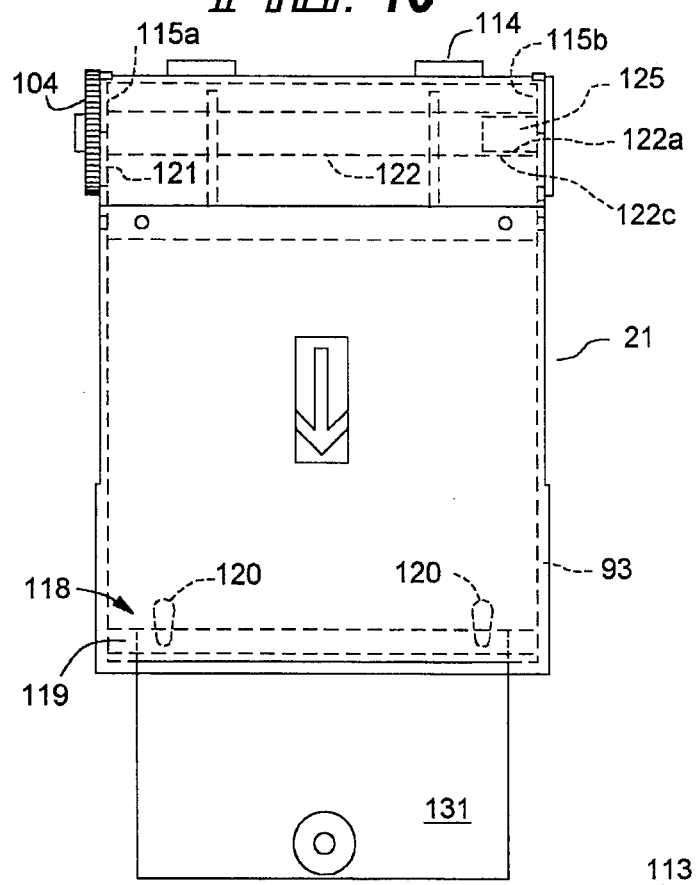
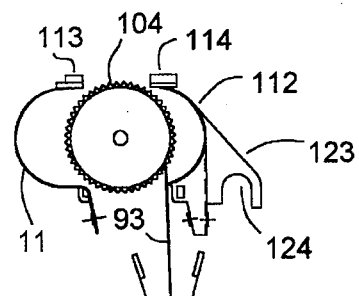
FIG. 16
FIG. 16A

CHECK WRITING MACHINE

BACKGROUND OF THE INVENTION

The present invention relates to an apparatus for imprinting checks, money orders, and other negotiable instruments.

Existing apparatus for imprinting negotiable instruments, employ moveable independent type segments, which when punctuation indicia is desirable, that is, periods, commas, or foreign currency symbols, such apparatus requires several internal and external components to be modified, redesigned, and retooled to accommodate such punctuation indicia. Additionally, existing check writers or apparatus for imprinting negotiable instruments employ an independently sliding prefix plate which allows the elimination of a space or series of easily altered symbols to be imprinted in front of the dollar amount. This prefix plate commonly imprints THE SUM tightly in front of the dollar amount, thus minimizing the opportunity for criminal alteration of the dollar amount. However, due to the various dollar amount capacity check writers manufactured, which may include anywhere from between five (5) to thirteen (13) independent type segments, several different sizes and configurations of these prefix plates must be produced to fit the various capacity check writers produced. Accordingly, this variation in size and configuration of prefix plates causes confusion in the ordering of replacement prefix plates as well as operational problems due to the incorrectly sized and dimensioned prefix plate malfunctioning in the check writer. Also, the present cross-sectional configuration of the prefix plate has proven to create oscillation inconsistencies and poor imprint quality.

At present, available manual check writers or apparatus for imprinting negotiable instruments use one of two common inking methods. The first method includes use of an ink roller or ink pad device. This method requires the operator to periodically reink the device which produces inconsistent imprints and presents a messy inconvenience to the operator. The second method includes the use of an inked fabric ribbon. This inking method also requires the operator to periodically change the internal ribbon, an operation which has proven to be a difficult and messy procedure. For this reason, maximum security dye based inks are not commonly used in the manufacture of the ribbon fabric of such ink ribbon assemblies for check writing machines. Another problem encountered with the use of an ink ribbon assembly in check writers involves the self-reversing mechanism used with such ink ribbon assemblies. Because the self-reversing mechanism is a tension driven application, successful activation of the mechanism requires that proper tension be maintained at all times on both the ribbon and take-up spools, a result which is difficult to control and to maintain with such replacement ink ribbon assemblies.

SUMMARY OF THE INVENTION

It is one object of the present invention to provide for a novel check writing machine which avoids the disadvantages of the prior art check writing machines while providing significant structural and operating advantages.

Another object of the present invention is a manual check writer which, because of the use of uniquely structured offset moveable type segments, readily allow and permit the printing of custom orders of financial instruments of predetermined punctuation and substantially uniformly spaced indicia on the printing line of the financial instrument.

It is another object of the present invention to provide for various capacity check writer machines which utilize one size of a prefix plate.

A further object of the present invention is a novel cross-sectional configuration of a prefix plate which eliminates oscillation inconsistencies and poor imprint qualities of prior art check writer machines.

It is still another object of the present invention to provide a self-contained replaceable ribbon cartridge for use with a check writing machine which enhances the consistency of the spool tension, which protects the end user during use of security dye based inks, and which permits the ink ribbon cartridge to be easily and readily replaced.

Finally, manual check writing or apparatus for imprinting negotiable instruments have focused on the commercial and banking markets. Therefore, these devices are designed for larger business type negotiable documents and are not conducive to the imprinting of personal sized checks. Thus, it is still another object of the present invention to provide a check writer machine which readily accommodates the imprinting of both personal and commercial size checks.

The check writer or apparatus for imprinting negotiable instruments in accordance with the present invention is comprised of a frame having a printing line therein, a plurality of type segment members supported by the frame, each type segment member including a set of printing characters thereon and is moveable to locate the desired printing character to the printing line, and means supported by the frame which is structurally arranged to receive and position a sliding prefix plate adjacent to the printing characters on the printing line. Each type segment member includes a printing face having a series of offset type segment printing characters on the printing face. The width and length dimensions of each printing face on each type segment is substantially identical. Additionally, the check writer includes an inked ribbon and ribbon support means supporting the ribbon adjacent to the printing characters disposed on the printing line, platen means supported by the frame, and actuating means supported by the frame and including an operating lever movable from a normal nonprinting position to an activated printing position for effecting the printing operation. Also, linkage means is operatively coupled to the operating lever and structurally arranged and coupled to the platen means for moving the platen means into pressure contact with the negotiable instrument positioned between the platen means and the printing characters disposed on the printing line to provide an imprint on the negotiable instrument and for returning the platen means and prefix plate back to their normal at rest position in the return movement of the operating lever to its normal at rest position.

The present invention consists of certain novel structural details hereinafter fully described, illustrated in the accompanying drawings, and particularly pointed out in the appended claims, it being understood that various changes in details may be made without departing from the spirit, or sacrificing any of the advantages of the present invention.

DESCRIPTION OF THE DRAWINGS

For the purpose of understanding the invention and facilitating the introduction of the significant improvements over the prior art in the field, there is illustrated in the accompanying drawings a preferred embodiment thereof, from an inspection of which when considered in connection with the following description, the invention, its construction, versatility, operation, and its advantages will be readily understood and fully appreciated.

FIG. 16 is a top plan view of the replaceable ribbon cartridge assembly in accordance with the present invention;

FIG. 16A is an exploded assembly view of the replaceable ribbon cartridge assembly in accordance with the present invention;

DESCRIPTION OF THE PREFERRED EMBODIMENT

Figure 1:
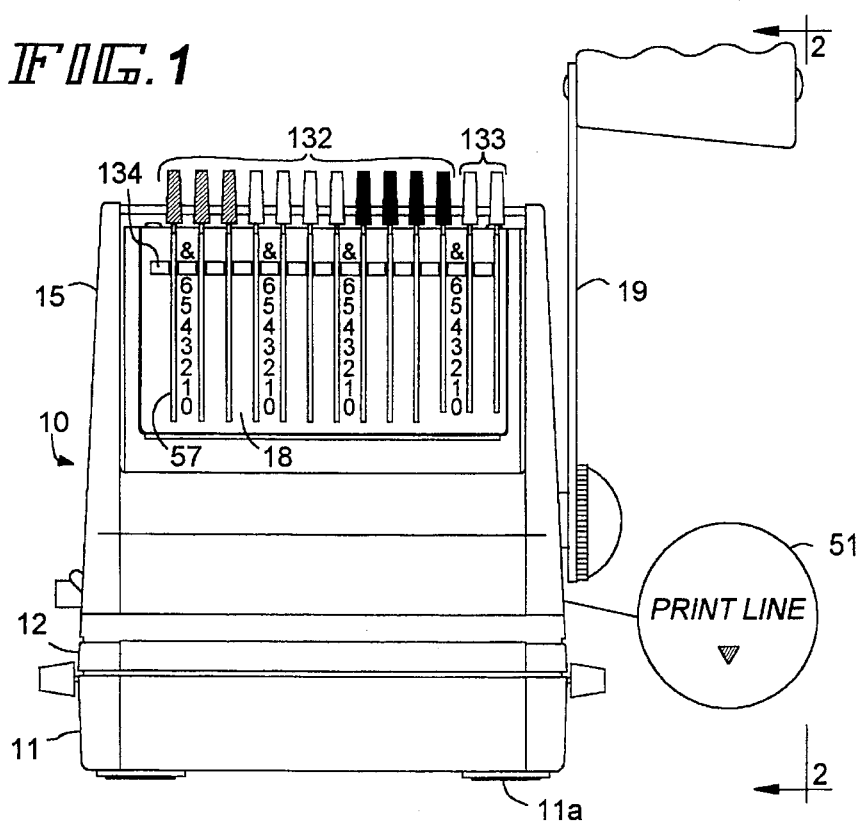
FIG. 1 is a front plan view of an imprinting apparatus incorporating features of the present invention.
Figure 2:
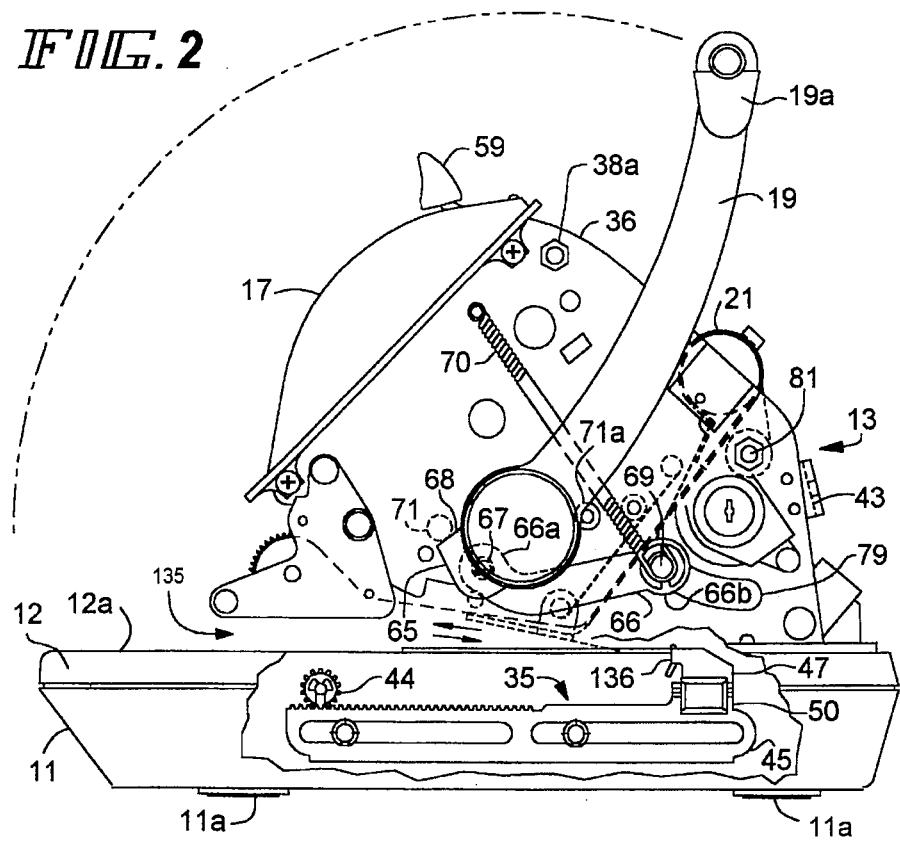
FIG. 2 is a sectional view of the imprinting apparatus taken along lines 2—2 of FIG. 1, with the top cover removed.
Figure 3:
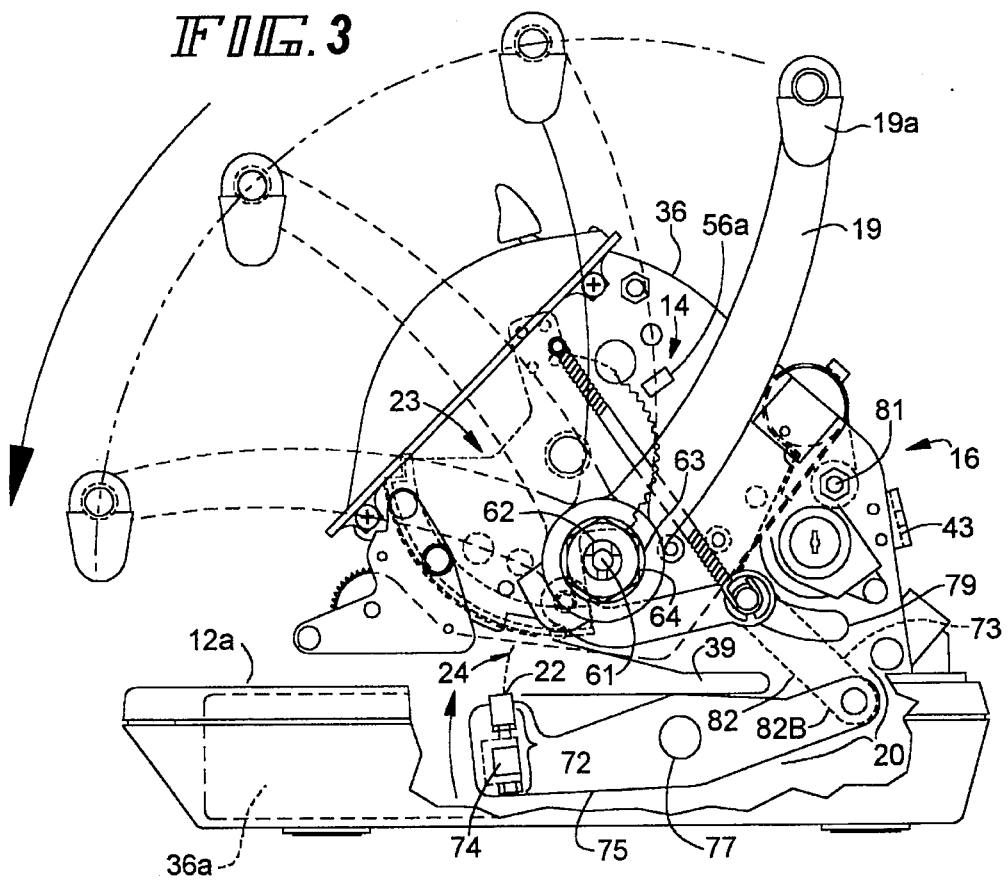
FIG. 3 is a sectional view of the imprinting apparatus of FIG. 2 illustrating the printing platen mechanism in accordance with the present invention.

Referring now to FIGS. 1–5, the present invention is directed to an imprinting apparatus or check writer, indicated generally at 10, which is used for printing commercial checks, money orders, personal checks, or other negotiable instruments. The imprinting apparatus or check writer 10 in accordance with the present invention is comprised of a base member portion 11, a base cover member 12, and a frame portion 13 (FIG. 2) which supports the printing mechanism 14 (FIG. 3). The check writer 10 further includes a removable one-piece top cover member 15 (FIG. 1), which encloses a frame printing mechanism 16 (FIG. 3), a face plate housing 17 (FIG. 2) for mounting a multiple capacity face plate 18, which designates imprint capacity, a manually operable operating lever 19 cooperating with the printing platen mechanism 20 for effecting the printing operation, and a replaceable security inked ribbon cartridge assembly 21. As will hereinafter be described, the structural association and arrangement between the top cover member 15, the face plate housing 17, the multiple capacity face plate 18 and the frame portion 13 provided by the present invention facilitates expeditious product assembly, facilitates and simplifies end user ribbon cartridge replacement, and facilitates regular service and maintenance of the check writer 10.

Figure 24:
FIG. 24, is a cross-sectional of a negotiable instrument view in accordance with the present invention.

The printing frame portion 13 of the check writer 10 includes upstanding side plates 36 and 37 (FIG. 4) secured together in parallel spaced relation by cross rods, bolts or support members 38 and by nuts 38a. The structural relationships between the elements provided by the present invention provides for a substantial reduction in the width of all cross rod support members to permit the imprinting of personal sized checks 40, as shown in FIG. 22. The side plates 36 and 37 (shown in FIGS. 2 and 21) are of irregular polygonal configuration and are provided with forwardly extending base members 36a and 37a, respectively (shown in FIGS. 3, 4, and 21), which provide a rearwardly extending slot 39 (FIGS. 3, and 20–21) which receives the personal or commercial check 40 or 41, respectively, as will hereinafter be described. Additionally, the present invention is structurally arranged to provide frame stability when imprinting multiple copy negotiable instruments 42 (FIG. 24).

The enclosing top cover member 15 (FIG. 1) is structurally arranged to be secured to the printing frame portion 13 by means of a mounting cross bar or rod member 43, in a known manner. The cover member 15 encloses the printing frame portion 13 and working elements of the check writer and includes a face plate housing 17 (FIG. 2), a series of interchangeable multiple capacity face plates 18, which denote the check writer imprint capacity, and a base cover member 12 for the lower base member portion 11. The base cover member 12 encloses the forward extending base members 36a and 37a of side plates 36 and 37, respectively, below the extending slot 39, and which define the base member portion 11. The base cover member 12 provides a support platform 12a therein upon which the desired commercial check 41 (FIG. 23), personal check 40 (FIG. 22) or negotiable instrument 42 (FIG. 24) is inserted and positioned for imprinting. The base member portion 11 is, preferably, equipped with rubber or cushioned pads 11a to provide unit stability.

Document alignment in the check writer 10 is accomplished by a check stop traverse mechanism 35 (FIG. 2) consisting of a geared cross shaft 44, two ratcheted elongated brackets 45 and 46 (FIG. 5), a check stop member 47, a pair of check stop finger grip stems 48 and 49, and a pair of check stop buttons 50. Upon insertion of the commercial check, personal check or negotiable instrument into the extending slot 39 of the check writer 10, the desired document imprint line 24 (FIG. 3) is determined by the forward or backward movement, in tandem, of the manual check stop buttons 50, which move the check stop mechanism incrementally, forwardly or rearwardly to align the check or instrument with a visual PRINT LINE indicia 51, which is on the side of the top cover member 15, as shown in FIG. 1.

Figure 5:
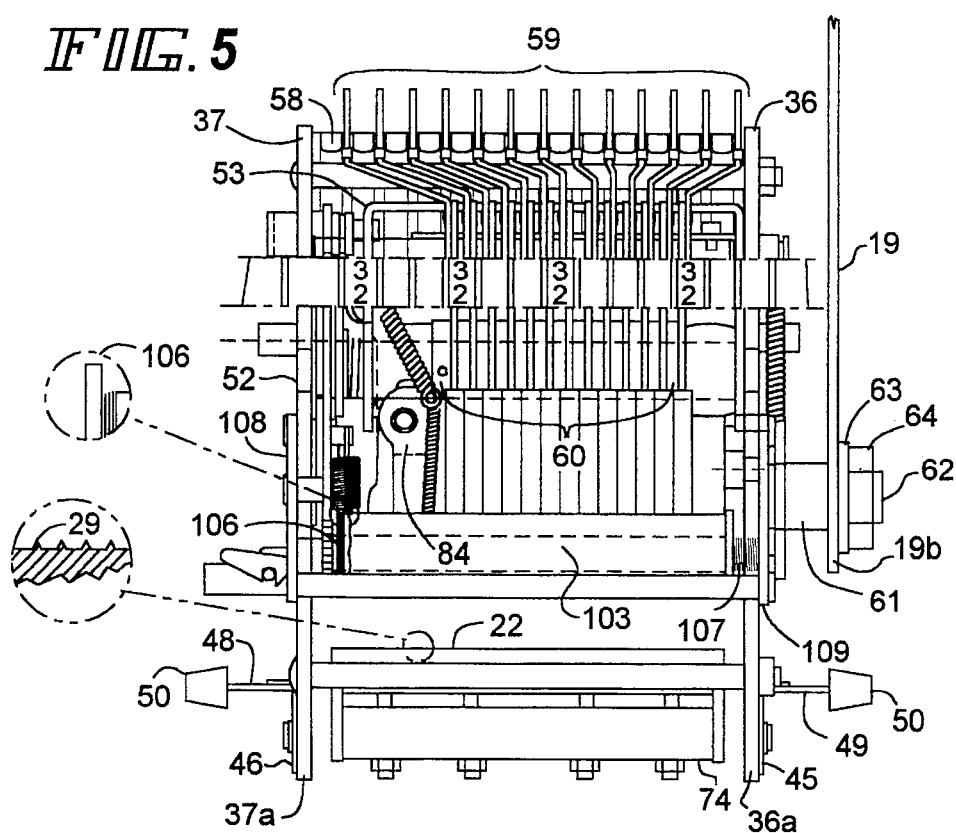
FIG. 5 is a front plan view of the imprinting apparatus with the cover removed illustrating thirteen (13) individual type segment members with punctuation indicia arranged in a typical check writer configuration in accordance with the present invention.
Figure 10:
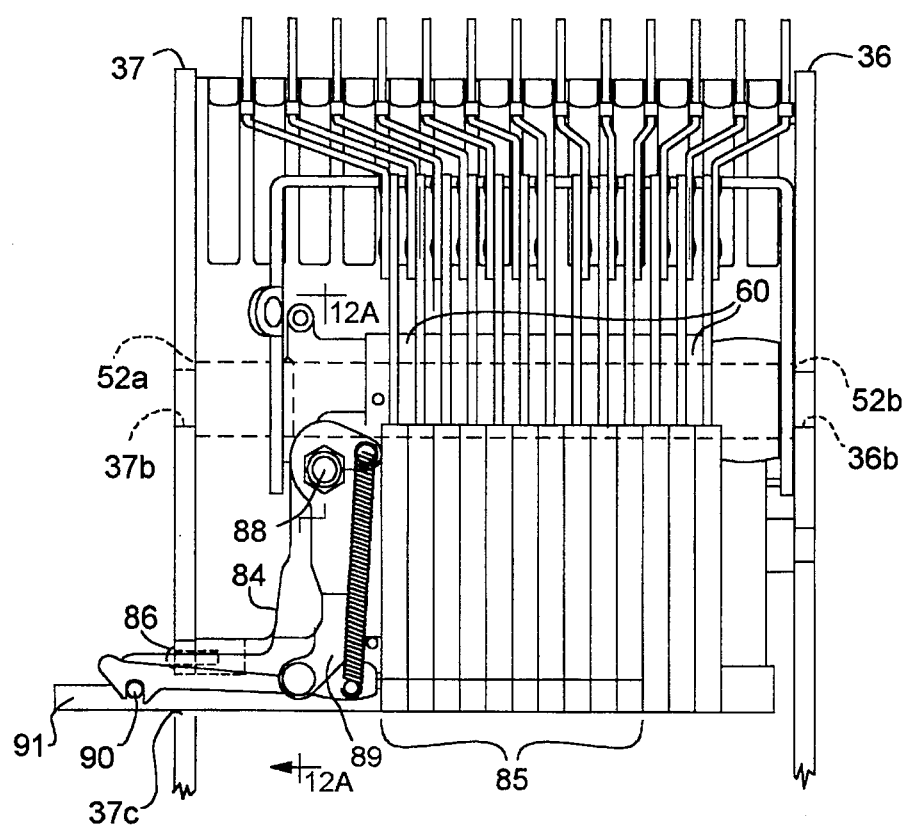
FIG. 10 is a front plan view illustrating the individual type segments arranged in an operating configuration in accordance with the present invention.

In FIGS. 5 and 10, a central cross shaft member 52 is mounted on and between the spaced side plates 36 and 37 by means of reduced diameters at its opposite ends which provide for shoulders 52a and 52b abutting the inner surfaces of the openings 36b and 37b in side plates 36 and 37, respectively, which restrain the shaft 52 against axial movement. FIGS. 5–9B illustrate the various type segment member 23 configurations contemplated by the present invention. The type segment members 23 (FIG. 5A) are mounted upon the main cross shaft 52 through opening 23a and structurally arranged for individual rotation or turning movement thereon and are maintained in spaced relation on the shaft by type segment spacing collars 60, as shown in FIG. 10.

Figure 11:
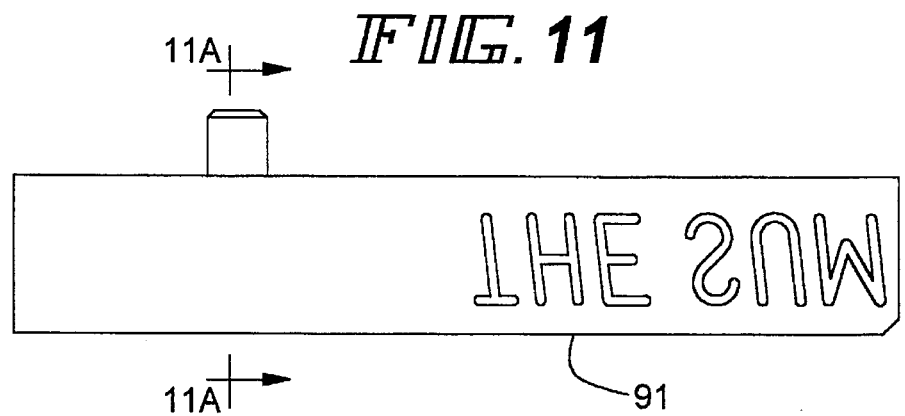
FIG. 11 is a top plan view of a prefix plate member in accordance with the present invention.

Mounted adjacent to one end of the main cross shaft 52 is a prefix plate holder mechanism 84 (FIG. 12) for accommodating the prefix plate member 91 (FIG. 11) and the type segment member clearing bail 53 (FIG. 5), which upon operator designation of the clearing mode, and upon completion of the imprint cycle, engages and returns all utilized type segment members 23 to their initial at rest positions, as will hereinafter be described.

Figures 5A, 5B:
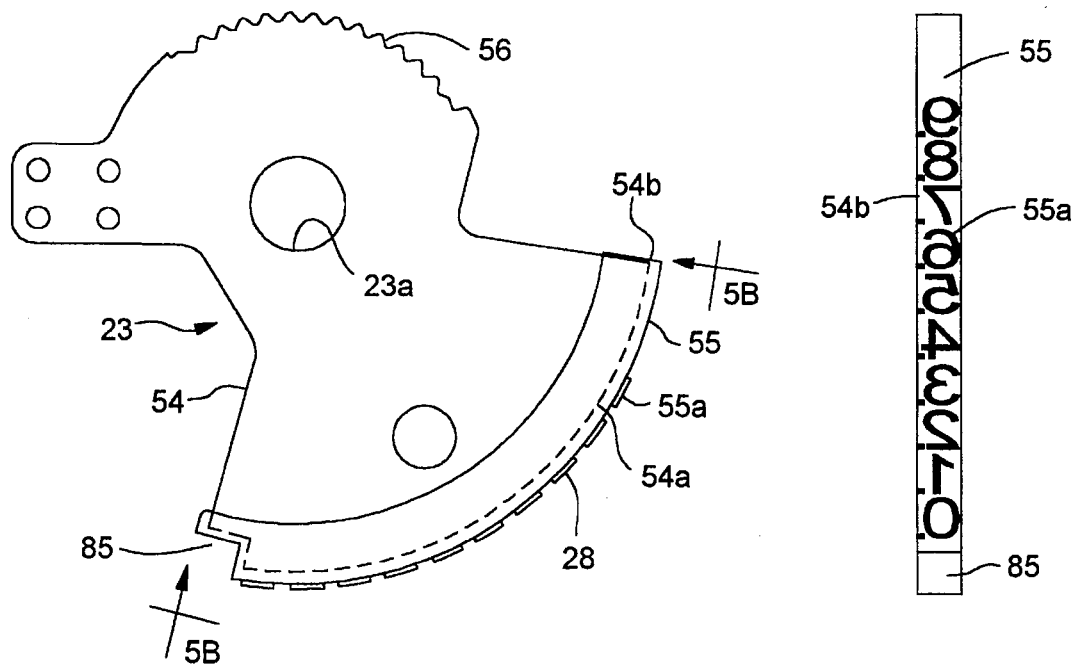
FIG. 5A is a side view of a type segment member in accordance with the present invention.
FIG. 5B is a sectional view of the type segment member taken along lines 5B—5B of FIG. 5A.
Figure 6:
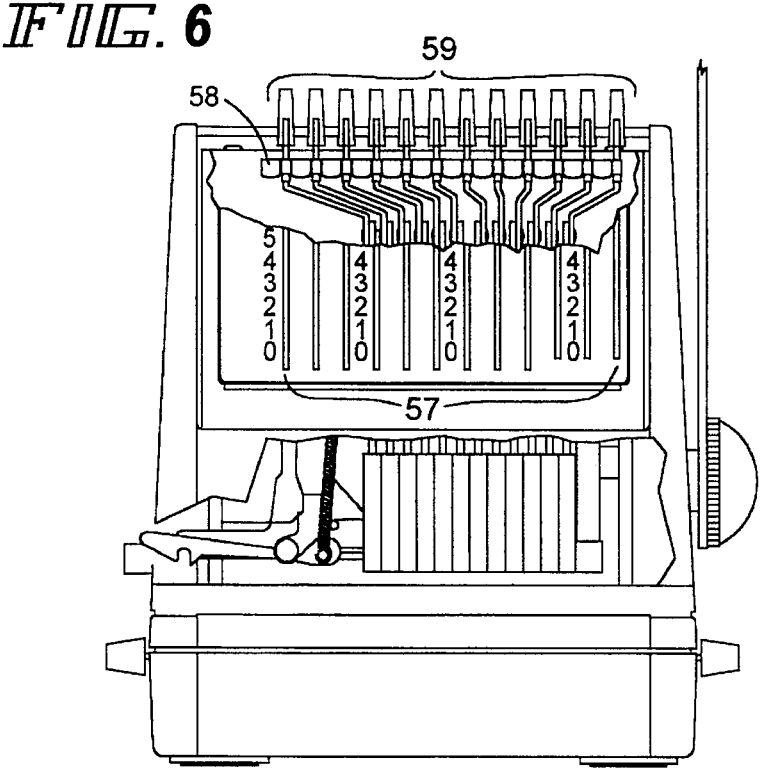
FIG. 6 is a front plan view of the independent type segments configured in a twelve (12) column check writer format in accordance with the present invention.
Figure 7:
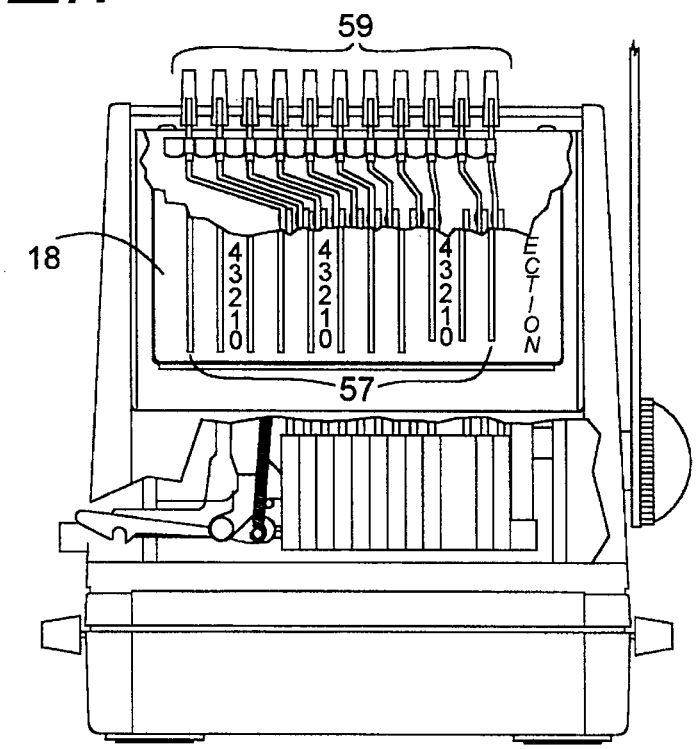
FIG. 7 is a front plan view illustrating type segments configured in an eleven (11) column format with a fixed currency symbol indicia segment at the decimal and far right positions in accordance with the present invention.
Figure 7A:
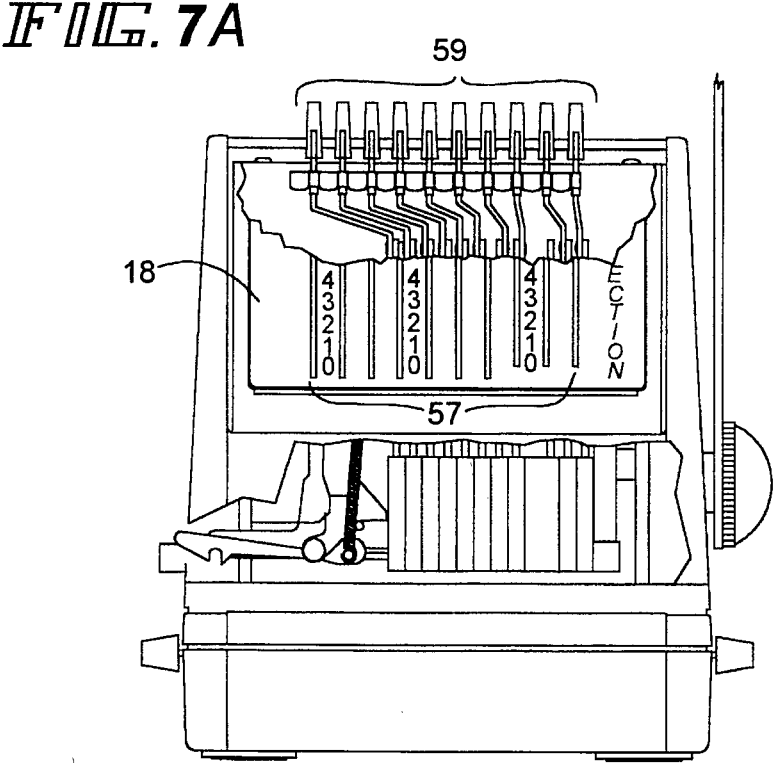
FIG. 7A is a front plan view illustrating segments configured in an ten (10) column format with a fixed currency symbol indicia segment at the decimal and far right positions in accordance with the present invention.
Figure 7B:
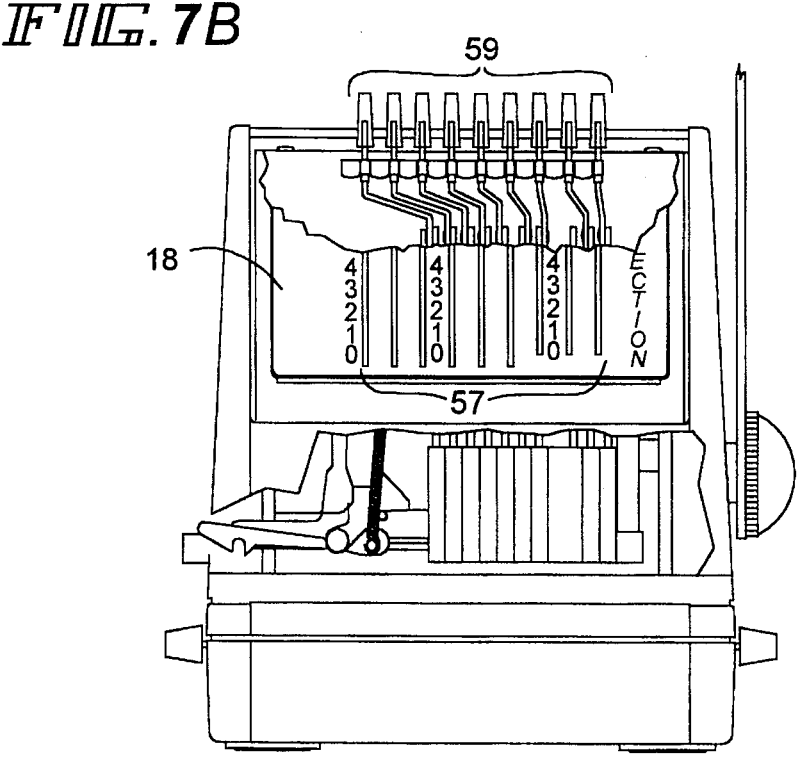
FIG. 7B is a front plan view illustrating segments configured in an nine (9) column format with a fixed currency symbol indicia segment at the decimal and far right positions in accordance with the present invention.
Figure 8:
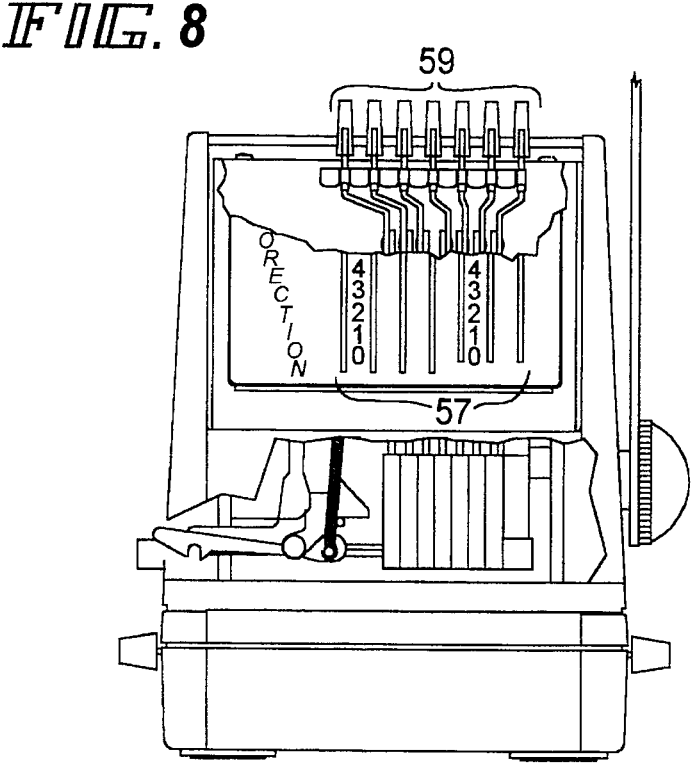
FIG. 8 is a front plan view of an imprinting apparatus to accommodate personal sized checks and commercial check configured in a seven (7) column type segment format in accordance with the present invention.
Figure 9:
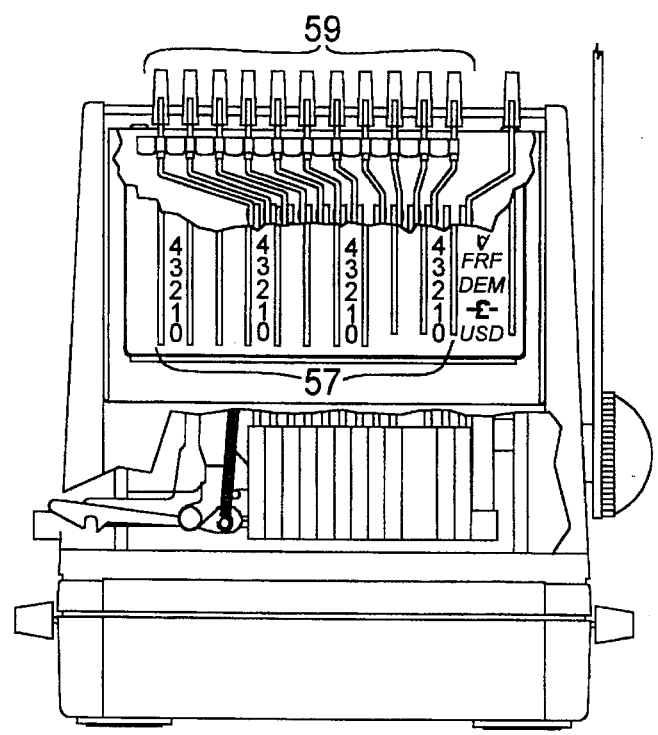
FIG. 9 is a front plan view of an imprinting apparatus to accommodate various foreign currency symbol indicia illustrating the type segment configuration with a selectively mounted multi-currency symbol segment at the right end of the imprint amount illustrating a portion of ten different customized currency symbols in accordance with the present invention.
Figure 9A:
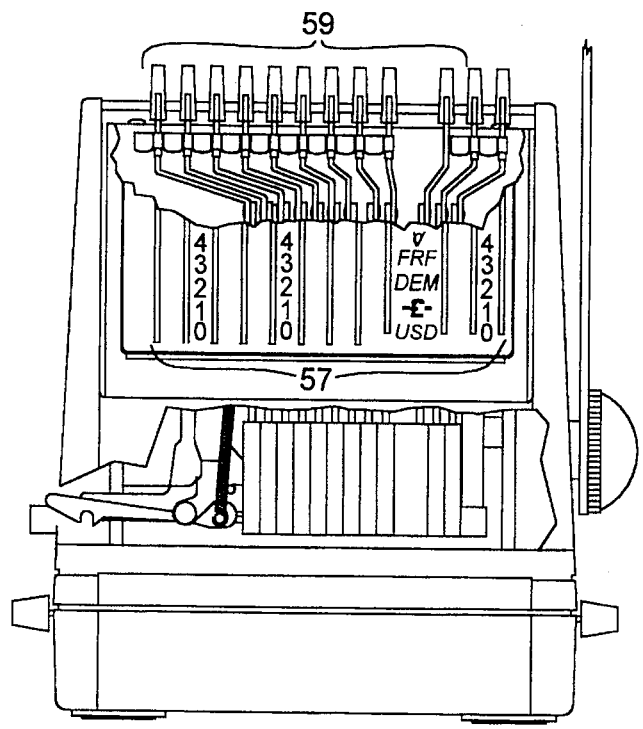
FIG. 9A is a front plan view of an imprinting apparatus to accommodate various foreign currency symbol indicia illustrating the type segment configuration with a selectively mounted multi-currency symbol segment at the decimal position of the imprint amount illustrating a portion of ten different customized currency symbols in accordance with the present invention.
Figure 9B:
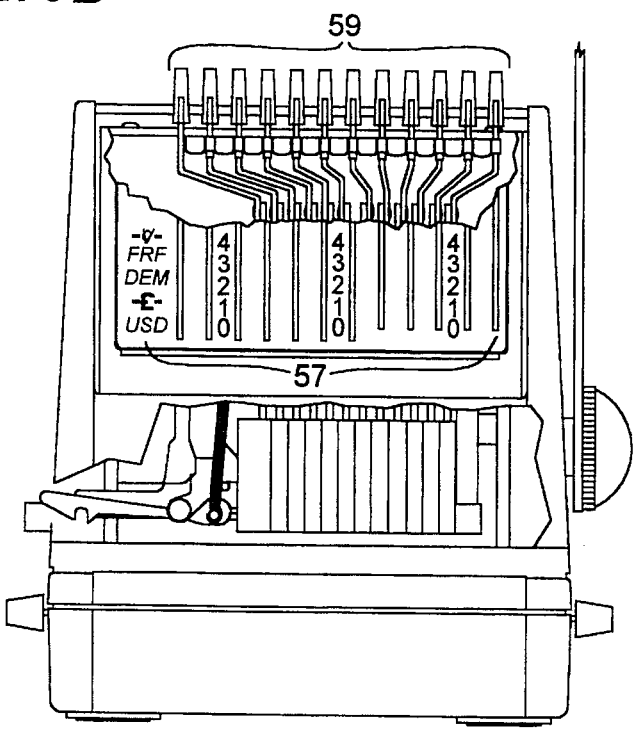
FIG. 9B is a front plan view of an imprinting apparatus to accommodate various foreign currency symbol indicia illustrating the type segment configuration with a selectively mounted multi-currency symbol segment at the left end of the imprint amount illustrating a portion of ten different customized currency symbols in accordance with the present invention.

The type segment members 23 depicted in the respective groupings in FIGS. 5–9B, each include an arcuate bar portion 54 (FIG. 5A) having upon its peripheral edge 54a a type bar 54b having a printing face 55 containing a series or sets of printing characters, punctuation, symbols numerals, or foreign insignia indicia 55a, as desired. As shown in FIGS. 3, 5 and 5A, each of the type segment members 23 is provided with a stepped tooth portion 56 which cooperates with a detent member 56a secured to the side plates 36 and 37 and which is engageable with the stepped tooth portion 56 to maintain the type segment members 23 in predetermined and selected positions, as desired. The characters or indica 55a on the printing face 55 are selectively and predeterminely positionable by means of finger grip members 59 protruding through face plate slots 57 in the face plate 18 (FIG. 1), with each finger grip member having a mounted number strip 58 thereon. The type segment members 23 are operatively associated and structurally arranged to position the sets of printing characters 55a on printing faces 55 on the printing line 24 (shown on dotted line in FIG. 3) of the check writer 10, in a manner known to the art.

Heretofore, a custom or foreign currency request for a check writer imprint format was expensive and time consuming due to the complex redesigning and retooling costs associated with changing the conventional component relationships. As illustrated by FIGS. 5–10A, the present invention contemplates predeterminely and selectively positioning a series of offset type segment characters 55a on adjacent printing faces 55 on the printing line 24.

Figure 10A:
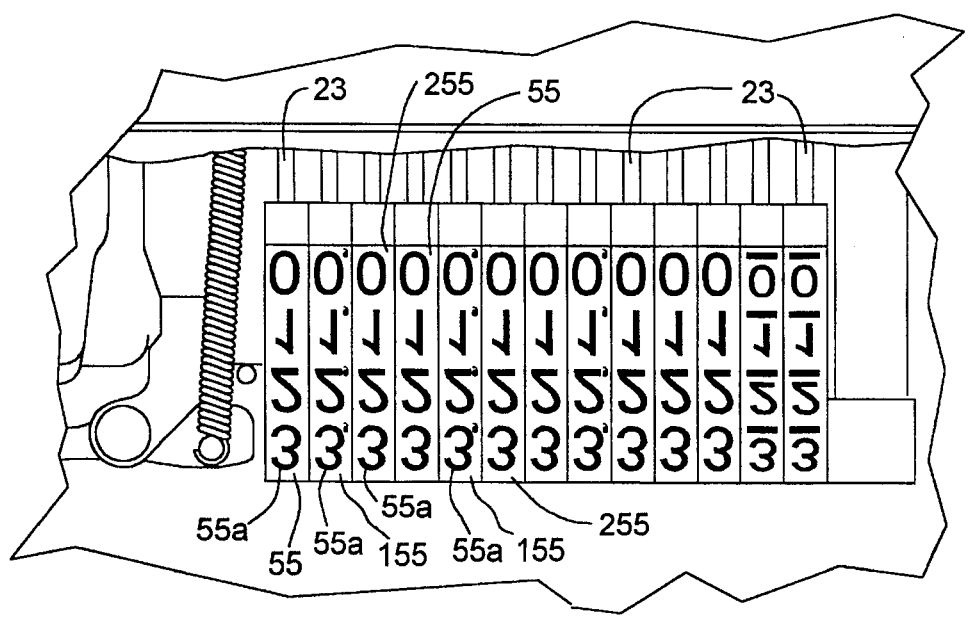
FIG. 10A is an enlarged fragmentary view similar to FIG. 10 illustrating individual type segments in side-by-side relationship within the operating configurations shown in FIG. 10.
Figure 23:
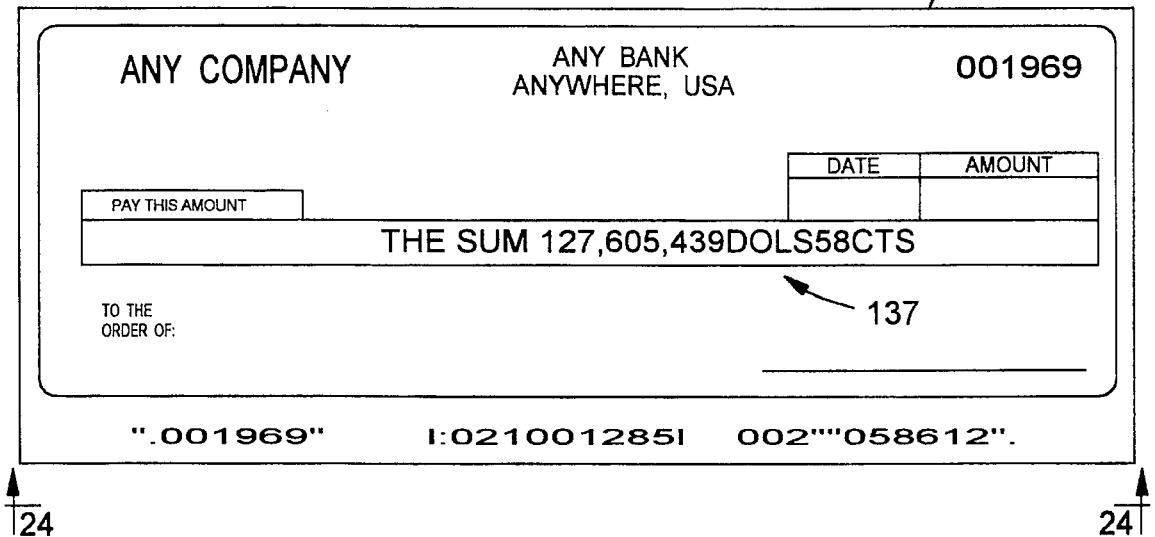
FIG. 23 is a top plan view of an imprinted negotiable document in accordance with the present invention.

As shown in FIG. 10A, the width and length dimensions of each printing face 55 on each type segment 23 is substantially identical. Additionally, the positioning of the printing face characters 55a on adjacent printing faces are generally of three configurations. For example, the printing face characters 55a on the printing face 55 are offset with respect to the side edges of the printing face 55 to provide printing face characters that are positioned nearer one side edge than the other side edge. The printing face characters 55a on the adjacent printing face 155 include printing face characters and punctuation that are offset and are substantially centered with respect to the elongated side edges. The printing face characters 55a on the adjacent printing face 255 are centered thereon with respect to the elongated side edges of the printing face. By selectively utilizing these three placement configurations of the characters 55a on the printing faces 55, 155 and 255, respectively, a constant gap distance of between 5–15/1000ths. of an inch is maintained between each adjacent sets or columns of printing characters 55a on adjacent printing faces, as is apparent from inspection of the printed amount on the imprint line 137 of the document 41 (FIG. 23). However, it is preferred by the present invention that the gap distance be between about 6–10/1000ths. of an inch between adjacent sets or columns of printing characters. Thus, the lateral relationships of the face plate finger grip slots 57 to common grouping combinations of finger grip members 59 and type segment spacers 60, permits the user of the check writer 10 to predeterminely select different type and printing character formats without any redesigning or retooling of the check writer 10.

In FIGS. 2, 3 and 5, the operating lever 19 has a conventional handle portion 19a on its outer end and a mounting end 19b which is secured in fixed relation to the outer end of a bushing 61 which is rotatably mounted on a stud shaft 62, secured to and projecting outwardly in normal relation from the side plate 36. The operating lever 19 is retained through a lock washer 63 and a nut 64. In this manner, the operating lever 19 may be turned or rotated in a counterclockwise direction, as viewed by the arrow in FIG. 2, from a normal rearward non-printing position to a forward actuated printing position. A drive link 65 (FIG. 2) is suitably secured to the bushing in generally normal relation to the axis of rotation of the bushing such that movement of the operating lever 19 effects a corresponding movement of the drive link 65. The plane of the drive link is spaced outwardly from the outer surface of the side plate 36.

An operating link 66 is pivotally connected at its forward end 66a through pivot pin 67 to the lower forward surface portion 68 of the inner side of the drive link 65. The rearward end 66b of link 66 is pivotally connected to a cross pintle 69, which forms part of the printing mechanism 16, as shown in FIG. 3. A return spring 70, which is connected between cross pintle 69 and the side plate 36 urges the rearward end 66b of link 66 forward and upwards, biasing the operating lever 19 towards its rearward at rest, non-printing position. The travel extent of the operating lever 19 is limited by stop pins 71 and 71a in side plate 36 which are engaged, respectively, by drive link 65 in its normal rest position or its printing position.

Figure 4:
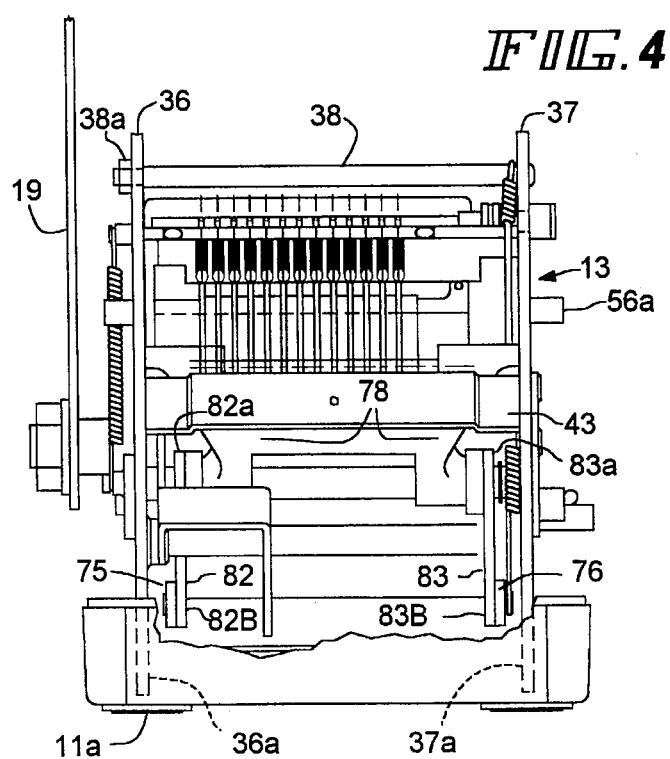
FIG. 4 is a rear plan view of the imprinting apparatus in accordance with the present invention with the cover removed illustrating the operating lever mechanism and its relationship to the printing platen mechanism.

Now referring to FIGS. 2–4, the printing mechanism 16 includes a platen assembly 72 and an actuating mechanism, indicated generally as 73. The platen assembly 72 is supported by the upstanding side frames 36 and 37 for movement from an at rest position, as shown in the downwardly positioning of FIG. 3, to an actuated position wherein the upward movement of the platen assembly, as shown by the arrow, causes the platen 22 to engage the printing characters 55a positioned on the printing line 24 in pressure contact with an instrument 40 (FIG. 22). The platen assembly 72 includes a platen support bar 74 suitably mounted at the forward ends of two parallel spaced support arms 75 and 76 (FIG. 4) rockably mounted on a cross shaft 77 extending between and mounted in the base portions 36a and 37a of the upstanding side plates 36 and 37. The platen 22 is adjustably mounted on the platen support bar 74 secured to and between the forward ends of the arms 75 and 76.

The actuating mechanism 73 couples the platen assembly 72 to the operating lever 19 and is structurally arranged to effect movement of the platen 22 from an at rest position to an actuated printing position upon movement of the operating lever 19 from its rearward non-printing position to its forward printing position. The pintle shaft 69 (FIG. 2) is carried by a toggle yoke 78 (FIG. 4) and extends transversely of the sides of the check writer with opposite end portions being received within arcuate slots 79 and 80, only slot 79 is shown in FIGS. 2 and 3, identically formed into the upstanding side plates 36 and 37. The toggle yoke 78 is pivotally supported at its upper end by a cross shaft 81 (FIG. 2) secured to and between the upstanding side plates 36 and 37. The arcuate slots 79 and 80 are concentric with the pivot axis of cross shaft 81 and structurally arranged to permit rearward pivotal movement of the pintle shaft 69 upon forward and downward movement of the operating handle 19.

A pair of toggle links 82 and 83 (FIG. 4) have their upper ends 82a and 83a, respectively, pivotally connected to the pintle shaft 69 through arcuate slots 79 and 80 which provide limited motion connections between the toggle links and the pintle shaft. The lower ends 82b and 83b of links 82 and 83, respectively, are pivotally connected to the rearward ends of respective platen support arms 75 and 76.

The pintle shaft 69 is provided at each end thereof and generally adjacent to side plates 36 and 37 with a circumferential groove (not shown) which receives a lock washer (not shown) for confining the upper end of the corresponding toggle link between the side edge of the toggle yoke 78 and an annular spacer (not shown).

Figure 11A:
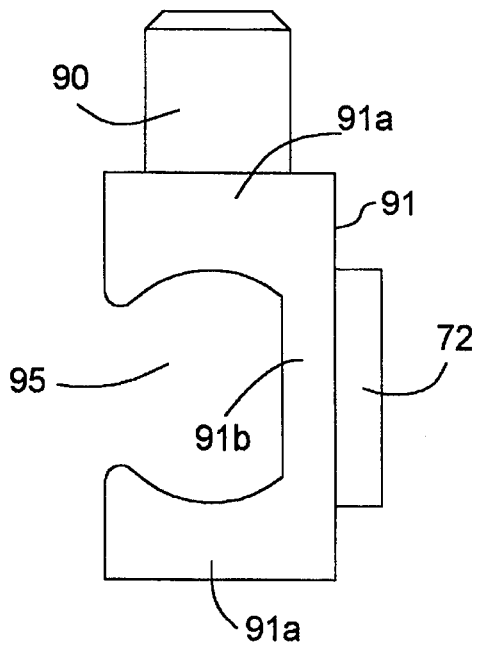
FIG. 11A is a view of the prefix plate member taken along lines 11A—11A in FIG. 11.
Figure 12:
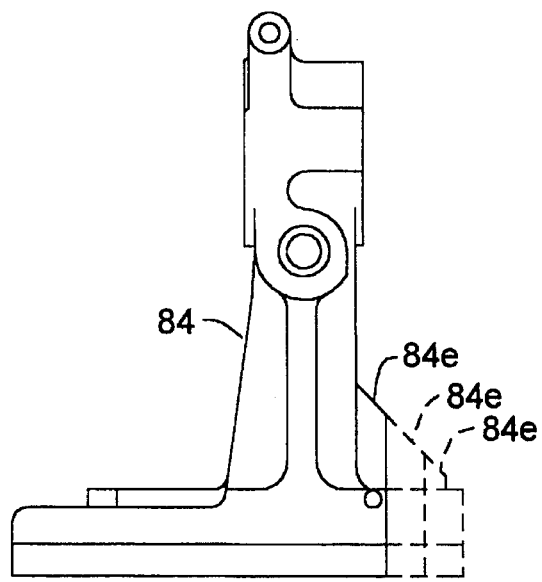
FIG. 12 is a side view illustrating various prefix plate member holder mechanisms in accordance with the present invention.
Figure 12A:
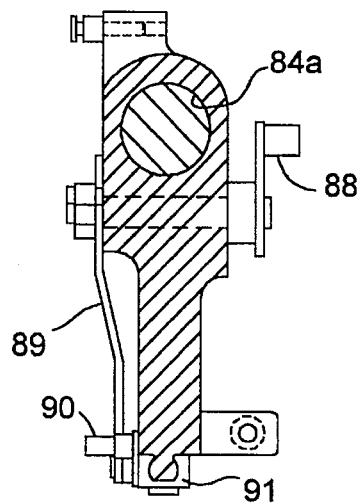
FIG. 12A is a sectional view of the prefix plate member holder mechanism taken along lines 12A—12A in FIG. 10.
Figure 14:
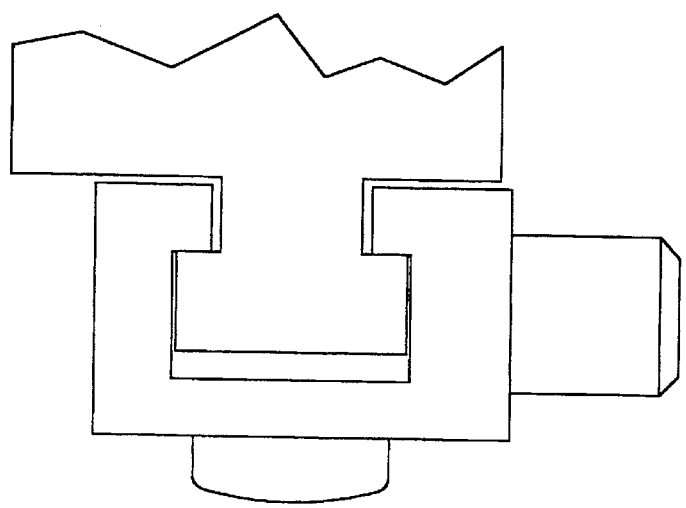
FIG. 14 is a cross-sectional view of the prefix plate member mechanism illustrating the attachment of the prefix plate to a prefix plate mechanism in accordance with the prior art.
Figure 14A:
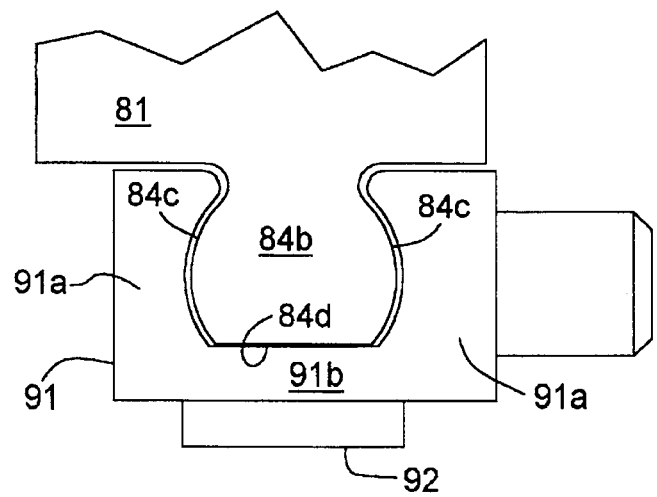
FIG. 14A is a cross-sectional view of the prefix plate member mechanism illustrating the attachment of the prefix plate member to the prefix plate mechanism in accordance with the present invention.

FIGS. 5–9 are illustrative of the various common type segment configurations in accordance with the present invention and FIGS. 10 and 12A illustrate the relationship of the prefix plate holder mechanism 84 with respect-to the specific type segment grouping. The holder mechanism 84 is supported by the cross shaft 52 and is mounted, in tandem with the individual type segment prefix plate notches 85 (FIG. 5A), through the opening 37c in upstanding side plate 37 by means of a commonly threaded fastener 86. As shown in FIG. 12A, the prefix plate holder mechanism 84 includes a bore 84a which is positioned about main cross shaft 52 and includes an elongated lower projecting mounting portion 84b which is structurally arranged to receive and hold a corresponding complimentary profiled prefix plate member 91, as shown in FIG. 14A. The curvilinear sidewalls or curved profile radial configuration 84c with a flat end surface 84d is adapted to receive a complimentary profiled prefix plate member 91 (FIG. 11A) having a cavity therein and extending the length thereof, and to provide full support for the prefix plate 91 during movement of the plate member 91 along the prefix plate notch 85 to engage the type segment member 23, as shown in sequence in FIGS. 15–15B. The complimentary elongated cavity 95 extending the length of the prefix plate is defined by curvilinear sidewalls 91a and a flat top wall 91a of the prefix plate. The prior art structure for the prefix plate holder mechanism 84 and associated plate member 91 is shown in FIG. 14, and is represented by U.S. Pat. No. 2,697,981, assigned to assignee of the present invention. The present holder mechanism and curved radial support configuration provides substantially improved cooperation between the holder mechanism 84b and the prefix plate member 91 by preventing binding and hanging up of the plate member 91 during its operative movement and by providing substantially improved imprint quality over an extended lifetime of usage, than the prior art assemblies.

Figure 15:
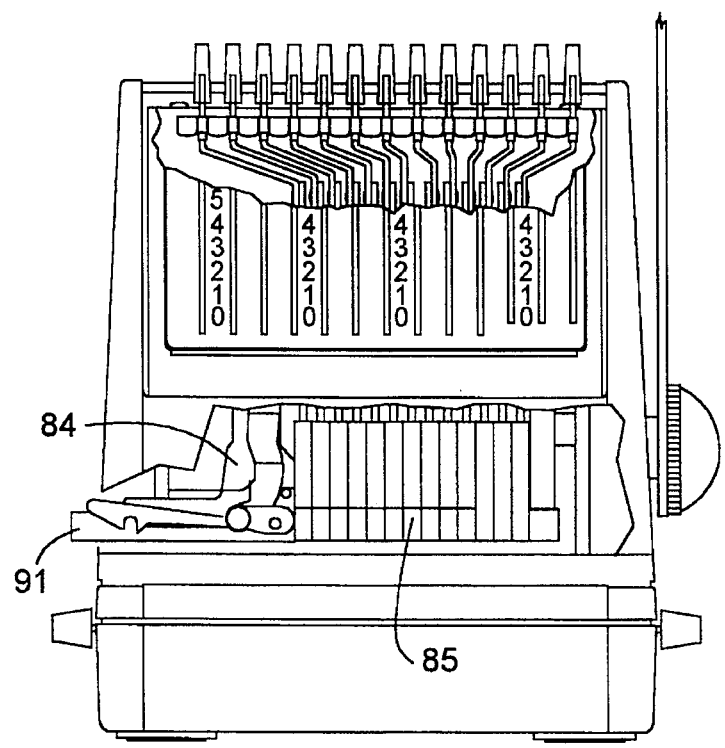
FIGS. 15, 15A and 15B are a series of sequential front views of the imprinting apparatus in accordance with the present invention, illustrating the oscillating action of the prefix plate member as the imprinter operating lever is activated from its at rest position to its imprint position.
Figure 15A:
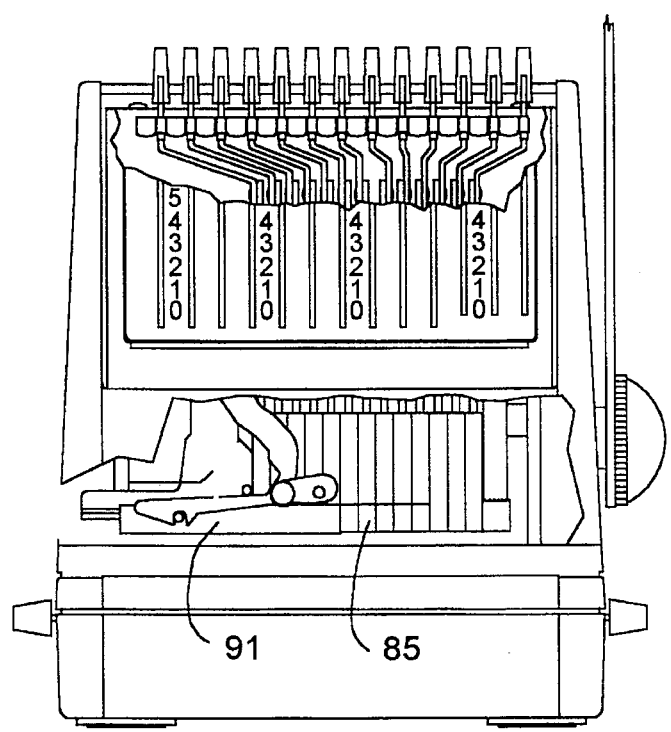
Figure 15B:
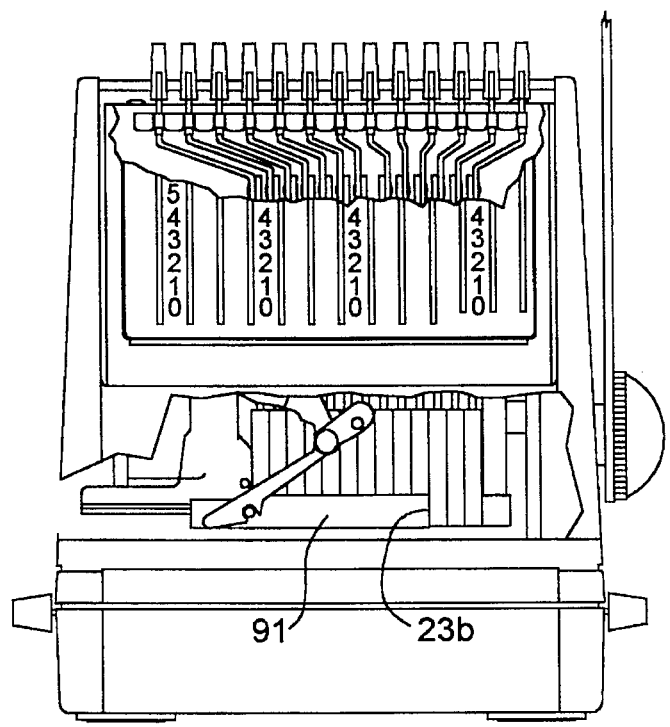
Figure 20:
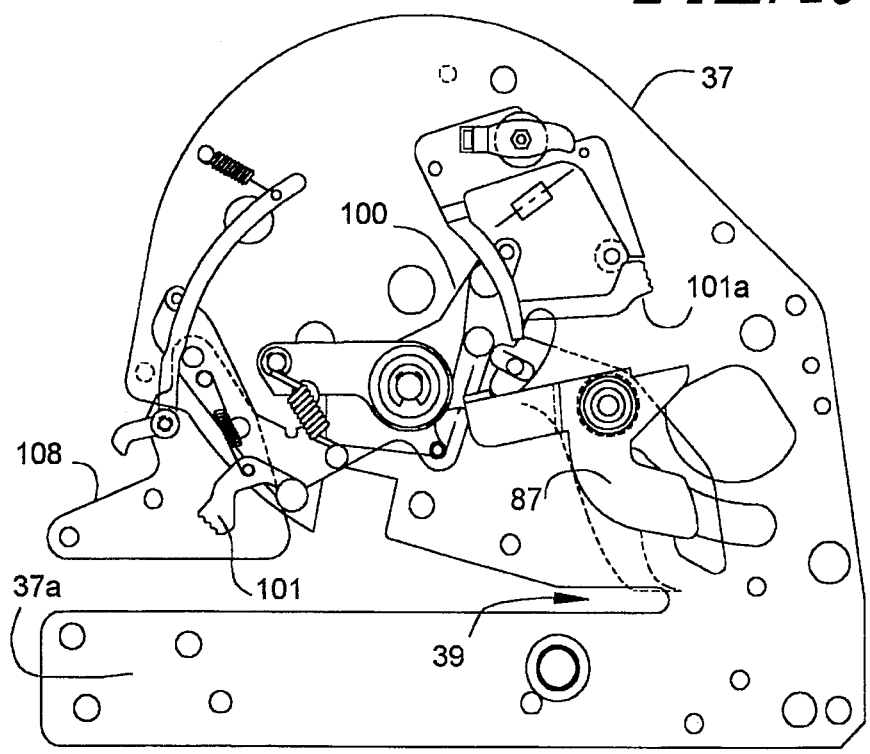
FIG. 20 is a view taken along lines 20—20 of FIG. 19.

Referring to FIGS. 10, 12A and 20, upon activation of the operating lever 19, the prefix plate shifting lever 87, rotatively mounted on the inside of the upstanding side plate 37 in axial relationship to the pintle shaft 69, is moved in a counterclockwise manner thereby engaging the prefix plate swing arm shaft assembly 88, to drop and rotate the swing arm assembly 89, which by means of engagement with the prefix plate pin 90, oscillates the prefix plate 91 (FIG. 11) across unused type segments 23 and the associated and aligned notches 85 before completion of the imprint cycle. As shown in FIGS. 15–15B, the prefix plate holder mechanism engages the prefix plate 91 and slidably moves the same from the intital position (FIG. 15) to the fully extended position (FIG. 15B) wherein the prefix plate is engaging the sidewall 23b of the type segment before completion of the imprinting cycle. Returning the operating lever 19 to its rearward rest position reverses the travel of the prefix plate 91 to its initial at rest position on the prefix plate holder 84.

Figure 13:
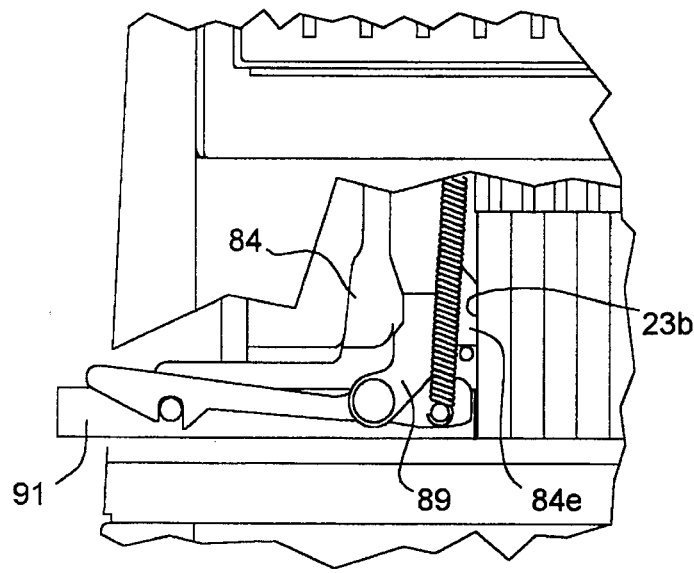
FIGS. 13, 13A and 13B are enlarged fragmentary views illustrating the positioning of the prefix plate member mechanism to various type segment capacity configurations in accordance with the present invention.
Figure 13A:
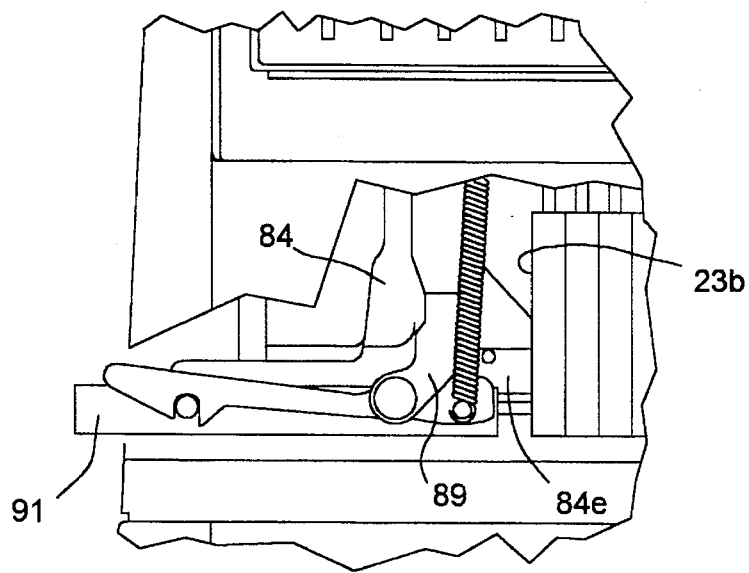
Figure 13B:
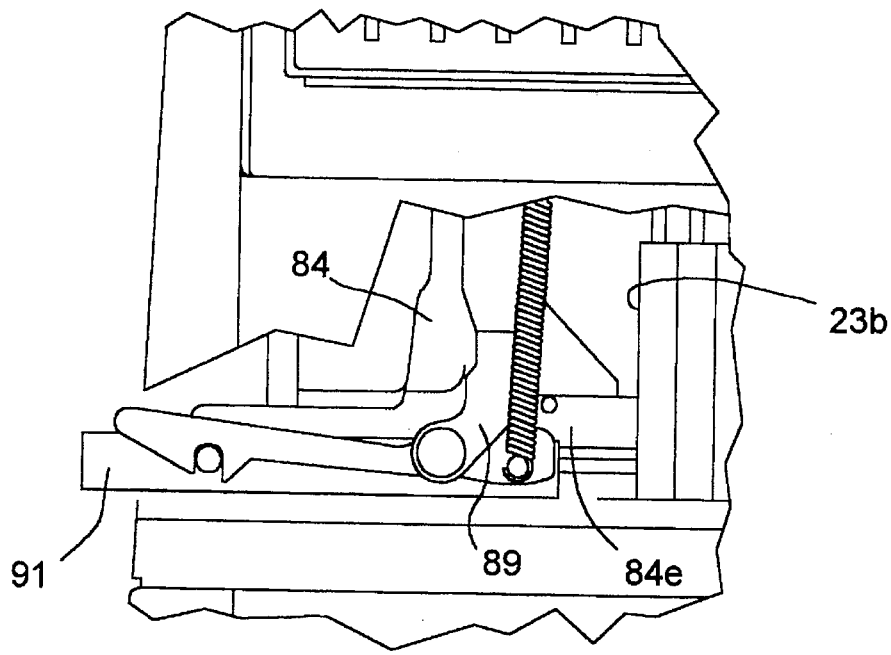

As illustrated by FIGS. 12 and 13, the prefix plate holder mechanism 84 in accordance with the present invention is sized and manufactured with a forward projection portion 84e which is dimensioned to provide various lengths of lower projecting mounting portions 84b which permits a single size and length of prefix plate member to be mounted thereon to accommodate various type segment capacity configurations to engage the side wall 23b of the type segment 23. Such a structure provides for the successful use of a single prefix plate 91 having a single prefix pin location 90 for the complete spectrum of check writer type segment capacities, as shown in FIGS. 5 through FIGS. 9A.

FIG. 14A illustrates a sectional view of the mating relationship of the prefix bar holder 84 and the prefix plate 91, which provides for the oscillation or positioning travel of the prefix plate and provides for a positive, consistent imprint of the prefix plate impression surface 92 to any increment of the type segment grouping. The operative oscillation travel sequence of the prefix plate 91 is illustrated in FIGS. 15, 15A and 15B.

Figure 21:
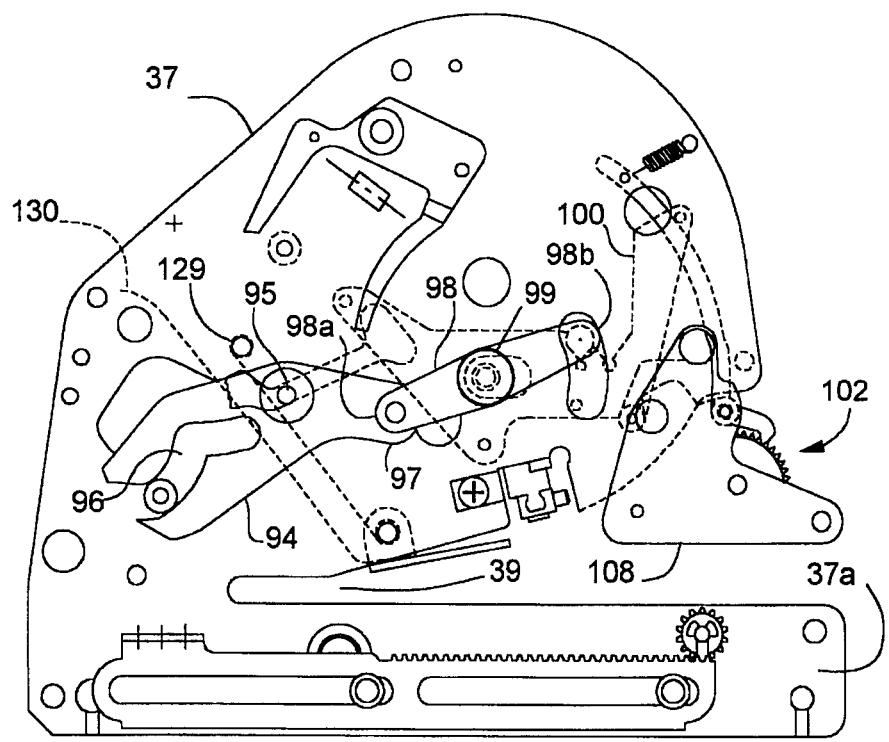
FIG. 21 is a view taken along lines 21—21 of FIG. 19.
Figure 22:
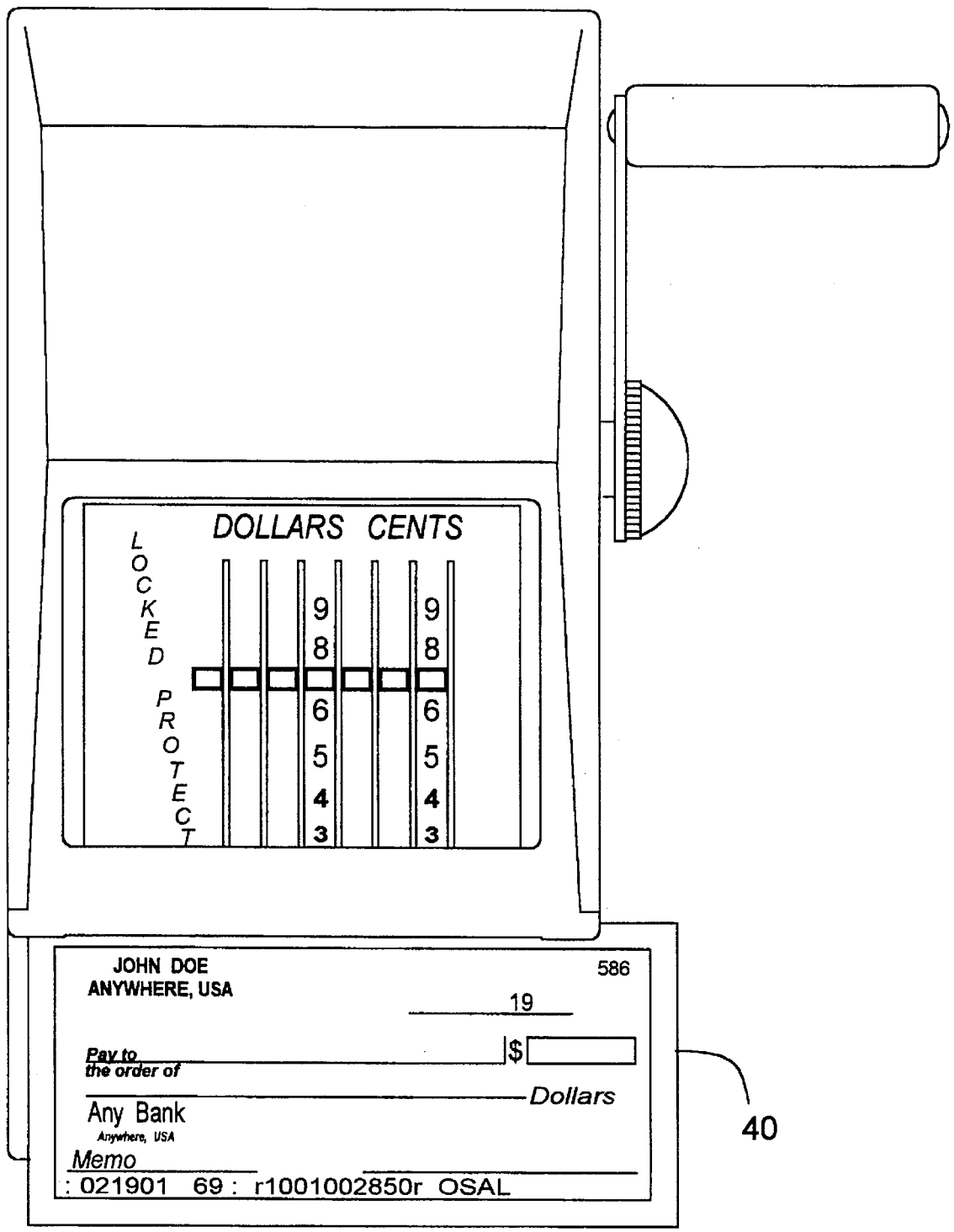
FIG. 22 is a top plan view of the imprinting apparatus in accordance with the present invention illustrating the imprinting of personal sized checks.

The replaceable inked ribbon cartridge and ribbon reverse mechanism in accordance with the present invention is generally illustrated in FIGS. 16 through 21. Referring to FIG. 21, the cartridge's mounting and operable imprint relationship are illustrated as installed within the check writer 10. For the purpose of advancing the inked ribbon 93 (FIG. 16) with each printing cycle, there is provided a follower link 94 which is pivotally mounted on the outer surface of side plate 37 by a pivot member 95. The follower link 94 defines a generally L-shaped slot 96 which extends rearwardly and then downwardly from a point near the pivotal attachment of link 94 to side plate 37, and adjacent to the arcuate slot 80 which defines the path of travel for the pintle shaft 69. The follower link 94 is pivoted counter-clockwise, by and as the pintle shaft 69 is driven rearwardly during a printing cycle.

Figure 19:
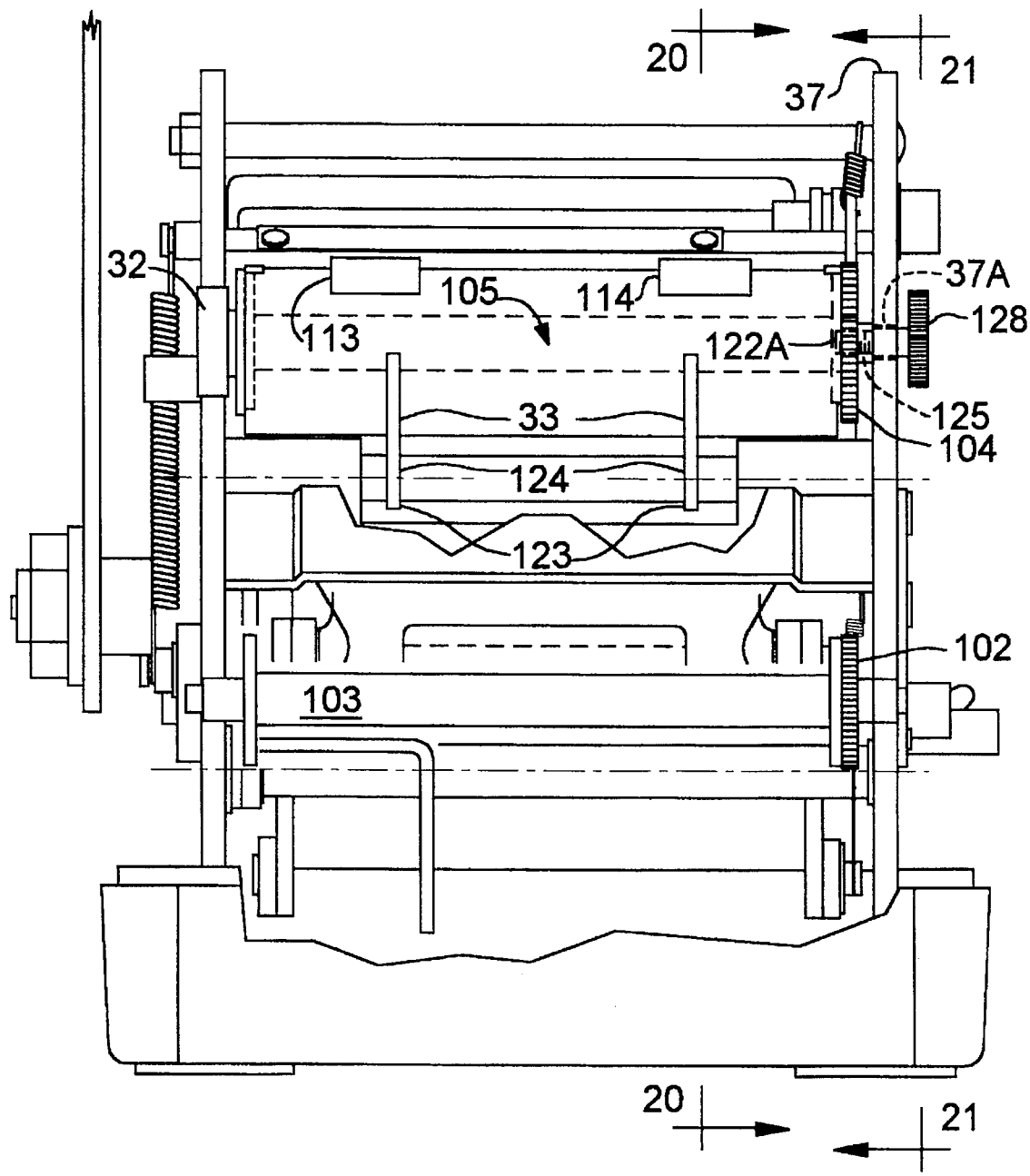
FIG. 19 is a rear elevational view of the imprinting apparatus in accordance with the present invention illustrating the mounting of the ribbon cartridge to the apparatus frame.

The forward end 97 of the link 94 is pivotally connected to one end 98a of the toggle link 98 which in turn is pivotally mounted on the side plate 37 by pivot member 99. The opposite end 98b of the toggle link 98 is pivotally connected to toggle link 100 which is pivotally connected on the inner face of side frame 37 and which couples a toothed drive member 101 (FIG. 20) to drive gear 102 of the take-up spool 103 (FIG. 19) and a toothed drive member 101a to drive gear 104 of the cartridge spool 105 (FIG. 19). To assure positive lateral tracking and a tight circular wrap 106 of the inked fabric 93, constant lateral tension must be maintained on the take-up spool 103 (FIG. 19) and the cartridge spool 105 (FIG. 19). Constant spool tension to the take-up spool 103, is accomplished by use of a compression spring 107 (FIG. 5), which applies a constant lateral pressure against the take-up spool 103 and the take-up spool support arms 108 and 109. Inherently due to the downward arcing force required to drive the rear ribbon spool (cartridge spool 105 in FIG. 19), known check writer tension ribbon reverse mechanisms have experienced high failure rates because of the inability of the prior art mechanisms to provide sufficient, consistent lateral tension which will not be overcome or distorted by the associated drive mechanism after repeated imprint cycles.

Figure 17:
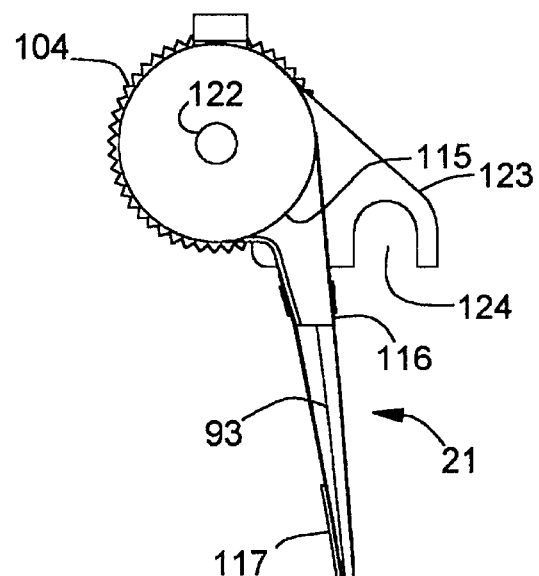
FIG. 17 is a side elevational view of the assembled ribbon cartridge illustrating the spool and ribbon cartridge configuration in accordance with the present invention.
Figure 18:
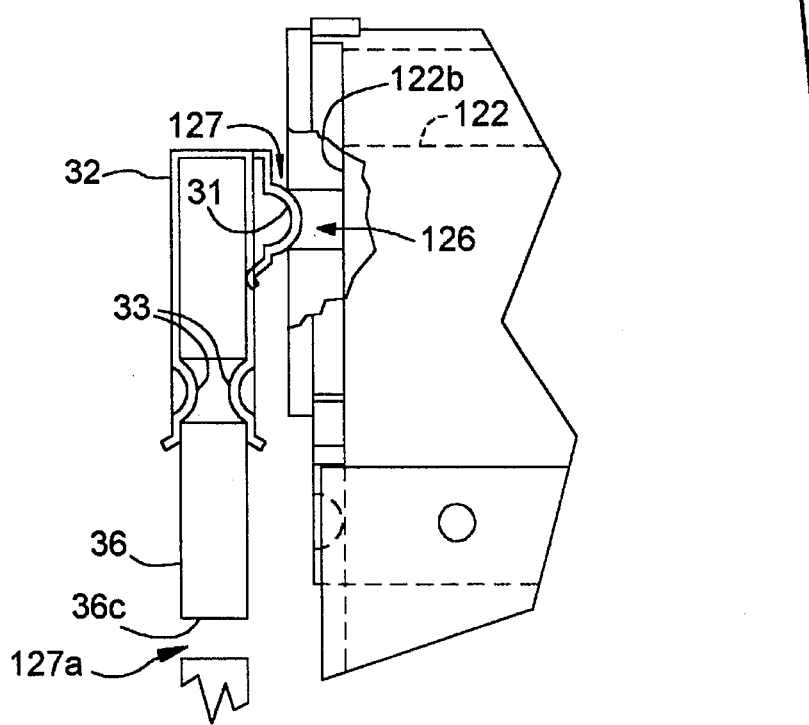
FIG. 18 is an enlarged fragmentary view of the spool tensioning mechanism and its associated interaction with the ribbon cartridge assembly in accordance with the present invention.

In accordance with the present invention, a positive force and counterforce relationship between the cartridge spool 105, its drive gear 104, the toggle link 100, and the toothed drive member 101a is provided. This counterbalance force relationship is created by the operable interaction of the ribbon cartridge assembly 21, the rear cartridge ribbon spool 105, and the rear spool tension device 32. The cartridge assembly 21 (FIG. 16A) includes a housing having an upper housing member 111 and a lower housing member 112 constructed and structurally arranged to be assembled, latched, and heat fused together by complementary latch elements 113, 114. As shown in FIG. 17, the upper and lower housing members, when assembled together, define a spool receiving chamber 115, a ribbon guide portion 116 and a throat portion 117 communicating the chamber 115 with the ribbon guide portion 116. The fabric ribbon 93 is wound on the cartridge spool 105 which is contained within the receiving chamber. The free end of the ribbon fabric 118 includes a pull tab 119 provided with a pair of slots 120 which are received on pegs (not shown) on the front take-up spool 103 (FIGS. 5 and 19). The advance cycle of the take-up spool 103 has been previously described. Up to 3 and ⅓ yards of ribbon are provided for each cartridge assembly, producing 4500 to 7500 acceptable imprints.

The sides 115a and 115b of the spool receiving chamber define apertures 121 which pass the ends of the cartridge spool shaft 122, as shown in FIG. 16. The upper housing member 111 and a lower housing member 112 are assembled and heat fused or staked together after a spool of ribbon has been inserted into the cartridge. For the purpose of mounting the inked ribbon cartridge assembly 21 to the check writer frame as shown in FIG. 16A, the lower housing member 112 includes a pair of downwardly extending fins 123 with an arcuate cutout 124 dimensioned to receive cross shaft 81 when the cartridge assembly is positioned and received in the check writer.

As illustrated in FIG. 19, one end 122a of the cartridge spool shaft 122 is counter bored 122c and tapped and receives the threaded shaft of a screw 125 which passes• through an aperture 37a in side plate 37, thereby facilitating removably securing of the cartridge to the check writer frame. The other end 122b of cartridge spool shaft 122 is provided with a molded concave female surface 126 (FIG. 18), which provide for reception of the convex male portion 31 of the cartridge spool shaft tensioning member 32, suitably mounted to side plate 36. The shaft tensioning member 32 includes a pair of inwardly extending projections 33 which are structurally arranged to be received by an opening 36c in side plate 36 when the member 32 is mounted to the side plate 36. These spherical engaging relationships, generally indicated at 127 and 127a, along with the downwardly extending fins 123 with an arcuate cutout 124, provides for constant and positive force and counterforce to be applied to the cartridge spool 105 when its drive gear 104 is driven by the toothed drive member 101a of the toggle link 100. In the prior art devices, the tension ribbon reverse failures were caused by the inability of flat spring tension and force to the cartridge spool upon constant force from the drive mechanism. Such deficiencies are eliminated by the present invention.

To replace the ribbon cartridge assembly 21, first the ribbon fabric 93 is rewound onto the supply spool 105 by turning the cartridge knob 128 (FIG. 19). When all of the ribbon is wound onto the supply spool and holding the cartridge knob tightly, the operating lever 19 is advanced to reverse the check writer mechanism to its forward position. When this position is attained, the cartridge knob is removed from the cartridge thereby freeing the cartridge from the frame. Then the pull tab 119, on the leading edge of the ribbon fabric, is removed from the front take-up spool 103. The ribbon cartridge assembly 21 may then be removed from the rear of the check writer 10.

A new cartridge 21 is then inserted into the unit from the rear, through and guided by a threaded aperture defined by the upper cartridge guide 129 (FIG. 21) and the lower cartridge guide 130, and moved forward until the spool receiving chamber 115 drops into its mounting position. In such a position, the tear-off ribbon leader 131, operatively connected to the pull tab 119, may be drawn from the cartridge and the pull tab slots 120 are connected to the front take-up spool 103. The tear-off leader 131 is then removed and the cartridge knob 128 replaced. In use, the enclosing top cover member 15 would then be remounted, completing the ribbon cartridge assembly replacement.

The unique mounting and spherical engaging relationship provided between the tensioning member 32, side plate 36, cartridge spool shaft 122 and the extending fins 123 provides also for improved ink fabric tracking and uniform concentric wrapping onto the spool 105 without extending onto the flanges of these spools. Thus, the free standing mounting of the ink cartridge 21 to the machine 10 provides a more stable structure and eliminates any problems associated with the reversing mechanism.

Referring to FIGS. 1 and 2, and FIGS. 20–24, which illustrate the relative positions of the operating lever 19 and the associated printing platen assembly 72 during the printing cycle, the operation of the check writer 10 will now be briefly described.

First, the user sets the desired dollar and cent amount by moving the individual dollar column finger grip buttons 132 and the individual cent column finger grip buttons 133 to the appropriate positions on the face plate 18. The desired amount is then verified in the face plate verification windows 134 to assure that the desired check amount appears. The document to be printed (FIGS. 23 and 24) is then inserted into the check receiving area 135 of the check writer to the rearward most position 136 until the document hits the check stop 47. The user them moves the check stop buttons 50 forward until the desired imprint line of the document 137 (FIG. 21), is aligned to the PRINT LINE demarcation 51 on the right-hand side of the enclosing top case 15. The imprint cycle is now ready to begin.

Initial movement of the operating lever 19, toward a forward printing position, moves the drive link 65 counter-clockwise driving the operating link 66 rearwardly. As the operating lever 19 is moved forwardly, the operating link 66 effects rearward movement of the cross pintle shaft 69 within the arcuate slots 79, 80. Such rearward movement of the cross pintle shaft 69 begins to drive the toggle links 82 and 83 rearwardly and downwardly. As the cross pintle shaft is moved further rearwardly within the arcuate slots 79 and 80 upon the continued forward movement of the operating lever 19, the toggle links 82 and 83 effect downward or clockwise rotation of the platen support arms 75 and 76 about their pivot axis, as viewed in FIG. 3, to raise their forward ends above their non-printing positions. Movement of the operating lever 19, to its printing position pivotally moves the actuating mechanism, indicated as 73 in FIG. 3, and drives the printing platen assembly 72 into pressure contact with the inked ribbon, the blank document, and the type characters disposed on the print line such that its serrated print face perforates the form while imprinting the desired dollar and cent amount, an example of which is shown in FIG. 23. In addition, the linkage including toggle link 100 (FIG 19A), and either directional toothed drive member 101 or 101a, advances the ribbon fabric 93 with each imprint cycle, providing a fresh ribbon surface for each impression.

Upon completion of the imprint cycle, the operating lever 19, is moved rearwardly thus returning the cross pintle shaft 69, the platen printing mechanism 73 and the printing platen 22, to their non-printing at rest position preparatory for a subsequent printing operation. FIG. 22 illustrates the relationship of a personal sized check 40 to the check writer 10 provided in accordance with the present invention, FIG. 23 illustrates the relationship of a commercial sized check 41 to the check writer 10 in accordance with the present invention, and FIG. 24 illustrates the relationship of a multiple sheet negotiable instrument 42 to the check writer 10 in accordance with the present invention.

By facilitating a ribbon exchange that is clean and requires virtually no contact with the inked fabric itself, the present invention provides for the introduction of pure dye based inks into the production of commercial consumer check writer ribbons. The importance of this novel innovation is the security enchancement of the imprint generated a by dye base ink versus that of the conventional pigment based inks because of the fact that imprints generated with pigment base ink remain on the surface of the transacted document, they can be easily criminally altered by either chemical or abrasive mechanical attack (erasure). Conversely, pure dye based inks only dry through migration into the paper stock. Thus, upon impact, the dye based inked ribbon provided by the present invention is driven deeply into the paper stock by means of the serrations 28 (FIG. 5A) in the outer character indicia faces 55a of the individual type segments 23, and the corresponding serrations 29 (FIG. 5) in the printing platen 22, to facilitate the security feature of virtual total migration of the imprinted image (FIGS. 22–24) to the backside of the documents 40, 41 and 42.

We claim:

1. A check writer for imprinting commercial checks, personal checks, money orders, and other negotiable instruments, including in combination:

a frame means, having a printing line therein;

a housing engageable with said frame means;

a plurality of type segment members with each member having a set of printing characters defining a single currency field on the peripheral printing face thereof, wherein said printing characters on selected ones of said type segment members are offset and include punctuation on said printing face, with each member thereof being supported by said frame means and each printing face having a uniform width and length of dimension and, with each of said type segment members being selectively moveable to locate said printing characters on said printing line;

a prefix plate holder assembly associated with said frame means, said holder assembly structurally arranged to receive and position a prefix plate member adjacent to said printing characters on said plurality of type segment members located on said printing line;

an inked ribbon and ribbon support means associated with said frame means for supporting said inked ribbon adjacent to said printing characters disposed on said printing line;

platen means supported by said frame and structurally arranged for cooperation with said printing characters disposed on said printing line;

actuating means supported by said frame means, said actuating means being moveable from an at rest non-printing position to a printing position for effecting the printing operation; and linkage means operatively coupled to said actuating means and structurally arranged and coupled to said platen means for moving said platen means from an at rest position to a printing position to provide pressure contact between the negotiable instrument and said printing characters on said type segment members located on said printing line when said actuating means is in the printing position and for moving said platen means to its normal at rest position in the return movement of said actuating means to its at rest non-printing position.

2. The check writer in accordance with claim 1, wherein said housing includes a face plate member for defining the imprint capacity of the check writer and a face plate housing portion for accommodating various capacity face plate members.

3. The check writer in accordance with claim 1, wherein said housing includes a removable top cover portion for permitting inked ribbon replacement.

4. The check writer in accordance with claim 1, wherein said frame means includes a lower base frame portion for housing said platen means and said mechanism for moving said platen means from its at rest position to its printing position.

5. The check writer in accordance with claim 1, wherein said sets of printing characters on selected ones of said type segment members are offset on said printing face.

6. The check writer in accordance with claim 1, wherein said prefix plate holder assembly when mounted in said frame means is positioned adjacent said plurality of type segment members.

7. The check writer in accordance with claim 1, wherein said printing characters on selected ones of said type segment members are centered on said printing face.

8. The check writer in accordance with claim 1, wherein said sets of printing characters on selected ones of said type segment numbers contain a plurality of foreign currency indicia symbols.

9. The check writer in accordance with claim 8, wherein said type segments are positioned in a plurality of locations on said printing face.

10. The check writer in accordance with claim 1, wherein the gap distance between adjacent sets of printing characters is between about 5–15/1000ths. of an inch.

11. The check writer in accordance with claim 10, wherein said cartridge includes an upper and a lower housing structurally arranged to be sealed together for defining a spool receiving chamber for said inked ribbon.

12. The check writer in accordance with claim 1, wherein said inked ribbon support means is a cartridge.

13. The check writer in accordance with claim 12, wherein said cartridge permits the usage of a security dye based inked ribbon.

14. The check writer in accordance with claim 1, wherein the gap distance between adjacent sets of printing characters is between about 5–10/1000ths. of an inch.

15. The check writer in accordance with claim 1, wherein said prefix holder assembly includes a mounting portion extending therefrom, said mounting portion structurally arranged to receive and mount said prefix plate member adjacent said plurality of type segment members.

16. A check writer for imprinting commercial checks, personal checks, money orders, and other negotiable instruments, including in combination:

a frame means, having a printing line therein;

a housing engageable with said frame means;

a plurality of type segment members with each member having a set of printing characters on the peripheral printing face thereof, with each member thereof being supported by said frame means and each printing face having a uniform width and length of dimension and, with each of said type segment members being selectively moveable to locate said printing characters on said printing line;

a prefix plate holder assembly associated with said frame means, said holder assembly structurally arranged to receive and position a prefix plate member adjacent to said printing characters on said type segment member located on said printing line;

a cartridge means having an inked ribbon and ribbon support means therein associated with said frame means for supporting said inked ribbon adjacent to said printing characters disposed on said printing line, with said cartridge means being removably mounted to said frame means by a spring clip member structurally arranged to engage said frame means and said cartridge means;

platen means supported by said frame and structurally arranged for cooperation with said printing characters disposed on said printing line;

actuating means supported by said frame means, said actuating means being moveable from an at rest non-printing position to a printing position for effecting the printing operation; and linkage means operatively coupled to said actuating means and structurally arranged and coupled to said platen means for moving said platen means from an at rest position to a printing position to provide pressure contact between the negotiable instrument and said printing characters on said type segment members located on said printing line when said actuating means is in the printing position and for moving said platen means to its normal at rest position in the return movement of said actuating means to its at rest non-printing position.

17. The check writer in accordance with claim 16, wherein said cartridge includes a spool shaft having a curvilinear surface in one end thereof and said spring clip member includes a projection having a curvilinear surface thereon which is structurally arranged to engage said one end to retain said cartridge to said frame means.

18. A check writer for imprinting commercial checks, personal checks, money orders, and other negotiable instruments, including in combination:

a frame means, having a printing line therein;

a housing engageable with said frame means;

a plurality of type segment members with each member having a set of printing characters on the peripheral printing face thereof, with each member thereof being supported by said frame means and each printing face having a uniform width and length of dimension and, with each of said type segment members being selectively moveable to locate said printing characters on said printing line;

a prefix plate holder assembly associated with said frame means, and structurally arranged to receive and position a prefix plate member adjacent to said plurality of type segment members, with said prefix holder assembly including a mounting portion extending therefrom and structurally arranged to receive and mount said prefix plate member adjacent said plurality of said type segment members, said mounting portion having curvilinear sidewalls which terminate with a flat planar bottom wall and said prefix plate member has a complimentary elongated cavity therein extending the length of said prefix plate member, with said cavity being defined by curvilinear sidewalls and a flat top wall of said plate member which permits mounting said prefix plate member to said prefix holder assembly and permits the sliding movement of said prefix plate with respect to said holder assembly;

an inked ribbon and ribbon support means associated with said frame means for supporting said inked ribbon adjacent to said printing characters disposed on said printing line;

platen means supported by said frame and structurally arranged for cooperation with said printing characters disposed on said printing line;

actuating means supported by said frame means, said actuating means being moveable from an at rest non-printing position to a printing position for effecting the printing operation; and linkage means operatively coupled to said actuating means and structurally arranged and coupled to said platen means for moving said platen means from an at rest position to a printing position to provide pressure contact between the negotiable instrument and said printing characters on said type segment members located on said printing line when said actuating means is in the printing position and for moving said platen means to its normal at rest position in the return movement of said actuating means to its at rest non-printing position.

19. A check writer for imprinting commercial checks, personal checks, money orders, and other negotiable instruments, including in combination:

a frame means, having a printing line therein;

a housing engageable with said frame means;

a plurality of type segment members with each member having a set of printing characters on the peripheral printing face thereof, with each member thereof being supported by said frame means and each printing face having a uniform width and length of dimension and, with each of said type segment members being selectively moveable to locate said printing characters on said printing line;

a prefix plate holder assembly associated with said frame means, with said prefix holder assembly including a mounting portion of various lengths extending therefrom, said mounting portion structurally arranged to receive and mount said prefix plate member adjacent said plurality of type segment members to engage said type segment members positioned in a plurality of locations on said printing line;

an inked ribbon and ribbon support means associated with said frame means for supporting said inked ribbon adjacent to said printing characters disposed on said printing line;

platen means supported by said frame and structurally arranged for cooperation with said printing characters disposed on said printing line;

actuating means supported by said frame means, said actuating means being moveable from an at rest non-printing position to a printing position for effecting the printing operation; and linkage means operatively coupled to said actuating means and structurally arranged and coupled to said platen means for moving said platen means from an at rest position to a printing position to provide pressure contact between the negotiable instrument and said printing characters on said type segment members located on said printing line when said actuating means is in the printing position and for moving said platen means to its normal at rest position in the return movement of said actuating means to its at rest non-printing position.

20. A check writer for imprinting commercial checks, personal checks, money orders, and other negotiable instruments, including in combination:

a frame means, having a printing line therein;

a housing engageable with said frame means;

a plurality of type segment members with each member having a set of printing characters on the peripheral printing face thereof, with each member thereof being supported by said frame means and each printing face having a uniform width and length of dimension, with each of said type segment members being selectively moveable to locate said printing characters on said printing line;

a prefix plate holder assembly associated with said frame means, said holder assembly including a mounting portion extending therefrom, said mounting portion having curvilinear sidewalls which terminate with a flat planar bottom wall and one sized prefix plate member has a complimentary elongated cavity therein extending the length of said prefix plate member, with said cavity being defined by curvilinear sidewalls and a flat top wall of said plate member which permits mounting said prefix plate member to said prefix holder assembly and permits the sliding movement of said prefix plate with respect to said holder assembly, said mounting portion being structurally arranged to receive and mount said prefix plate member to engage various type segment capacity configurations;

an inked ribbon and ribbon support means associated with said frame means for supporting said inked ribbon adjacent to said printing characters disposed on said printing line;

platen means supported by said frame and structurally arranged for cooperation with said printing characters disposed on said printing line;

actuating means supported by said frame means, said actuating means being moveable from an at rest non-printing position to a printing position for effecting the printing operation; and linkage means operatively coupled to said actuating means and structurally arranged and coupled to said platen means for moving said platen means from an at rest position to a printing position to provide pressure contact between the negotiable instrument and said printing characters on said type segment members located on said printing line when said actuating means is in the printing position and for moving said platen means to its normal at rest position in the return movement of said actuating means to its at rest non-printing position.

* * * * *